(12) United States Patent
Hirayama et al.

(10) Patent No.: US 9,100,379 B2
(45) Date of Patent: Aug. 4, 2015

(54) TRANSMITTING APPARATUS, TRANSMITTING METHOD, RECEIVING APPARATUS, RECEIVING METHOD, PROGRAM, AND ELECTRONIC APPARATUS

(71) Applicant: Sony Corporation, Tokyo (JP)

(72) Inventors: Yuichi Hirayama, Chiba (JP); Satoshi Okada, Tokyo (JP); Tamotsu Ikeda, Tokyo (JP); Naomichi Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 13/891,234

(22) Filed: May 10, 2013

(65) Prior Publication Data

US 2013/0308655 A1 Nov. 21, 2013

(30) Foreign Application Priority Data

May 18, 2012 (JP) .................................. 2012-115119

(51) Int. Cl.
*H04J 3/04* (2006.01)
*H04J 3/24* (2006.01)
*H04L 29/06* (2006.01)
*H04H 60/19* (2008.01)
*H04N 21/418* (2011.01)
*H04N 21/43* (2011.01)
*H04N 21/434* (2011.01)
(Continued)

(52) U.S. Cl.
CPC .............. *H04L 69/06* (2013.01); *H04H 60/19* (2013.01); *H04N 21/4181* (2013.01); *H04N 21/4305* (2013.01); *H04N 21/4344* (2013.01); *H04N 21/43607* (2013.01); *H04H 60/40* (2013.01)

(58) Field of Classification Search
USPC ................. 370/468–474, 487–535, 537–549; 725/87–90
See application file for complete search history.

(56) References Cited

U.S. PATENT DOCUMENTS 7,130,313 B2 * 10/2006 Pekonen ...................... 370/473
7,283,813 B2 * 10/2007 Hamanaga et al. .......... 455/415
(Continued)

FOREIGN PATENT DOCUMENTS

EP 2 442 464 A1 4/2012
EP 1 684 450 A2 7/2013
WO WO 2007/050217 A2 5/2007

OTHER PUBLICATIONS

C1 Plus Specification v1.3.1 (Sep. 2011) "Content Security Extensions to the Common Interface" 312 pages.
(Continued)

*Primary Examiner* — Man Phan
(74) *Attorney, Agent, or Firm* — Wolf, Greenfield & Sacks, P.C.

(57) ABSTRACT

Disclosed herein is a transmitting apparatus, including: a stream inputting portion inputting plural transport streams; an information adding portion adding additional information containing therein a stream identifier used to identify at least corresponding transport stream to respective transport stream packets of the plural transport streams thus inputted; a stream synthesizing portion synthesizing the plural transport streams in which the additional information is added to each of the transport stream packets, thereby obtaining one stream; and a stream transmitting portion transmitting the resulting one stream to an external apparatus. The information adding portion adds the additional information forward, backward or midway with respect to each of the transport stream packets.

13 Claims, 31 Drawing Sheets

(51) Int. Cl.
*H04N 21/436* (2011.01)
*H04H 60/40* (2008.01)

(56) References Cited

U.S. PATENT DOCUMENTS

| | | | |
|---|---|---|---|
| 7,924,876 B2 * | 4/2011 | Rezaei et al. | 370/468 |
| 8,270,821 B2 * | 9/2012 | Chen et al. | 386/354 |
| 8,275,003 B2 * | 9/2012 | Elstermann | 370/535 |
| 8,826,387 B2 * | 9/2014 | Waller et al. | 726/4 |
| 2001/0053142 A1 * | 12/2001 | Abe et al. | 370/337 |
| 2002/0101991 A1 | 8/2002 | Bacon et al. | |
| 2004/0114051 A1 | 6/2004 | Tournier | |
| 2004/0244037 A1 * | 12/2004 | Yamaguchi et al. | 725/37 |
| 2004/0252833 A1 | 12/2004 | Milner | |
| 2007/0110105 A1 * | 5/2007 | Usuki et al. | 370/487 |
| 2008/0298337 A1 | 12/2008 | Rezaei et al. | |
| 2011/0243522 A1 | 10/2011 | Chen et al. | |
| 2012/0308197 A1 * | 12/2012 | Lu et al. | 386/230 |

OTHER PUBLICATIONS

"Common interface specification for conditional access and other digital video broadcasting decoder applications", European Standard EN50221, Feb. 1997, 86 pages.

* cited by examiner

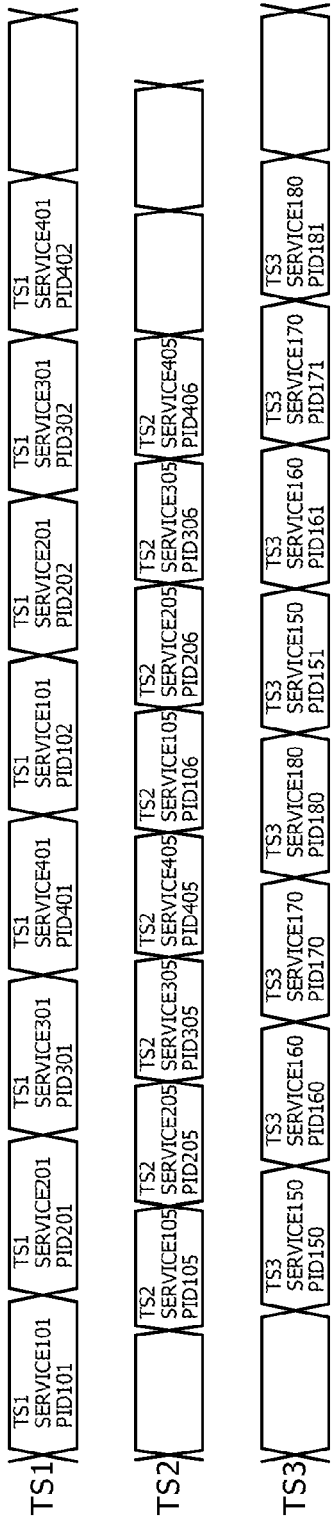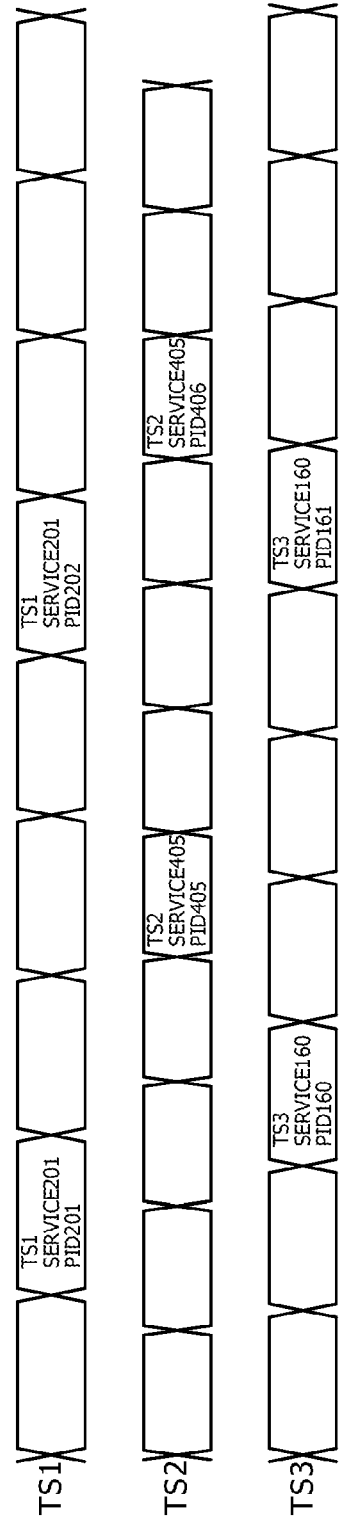

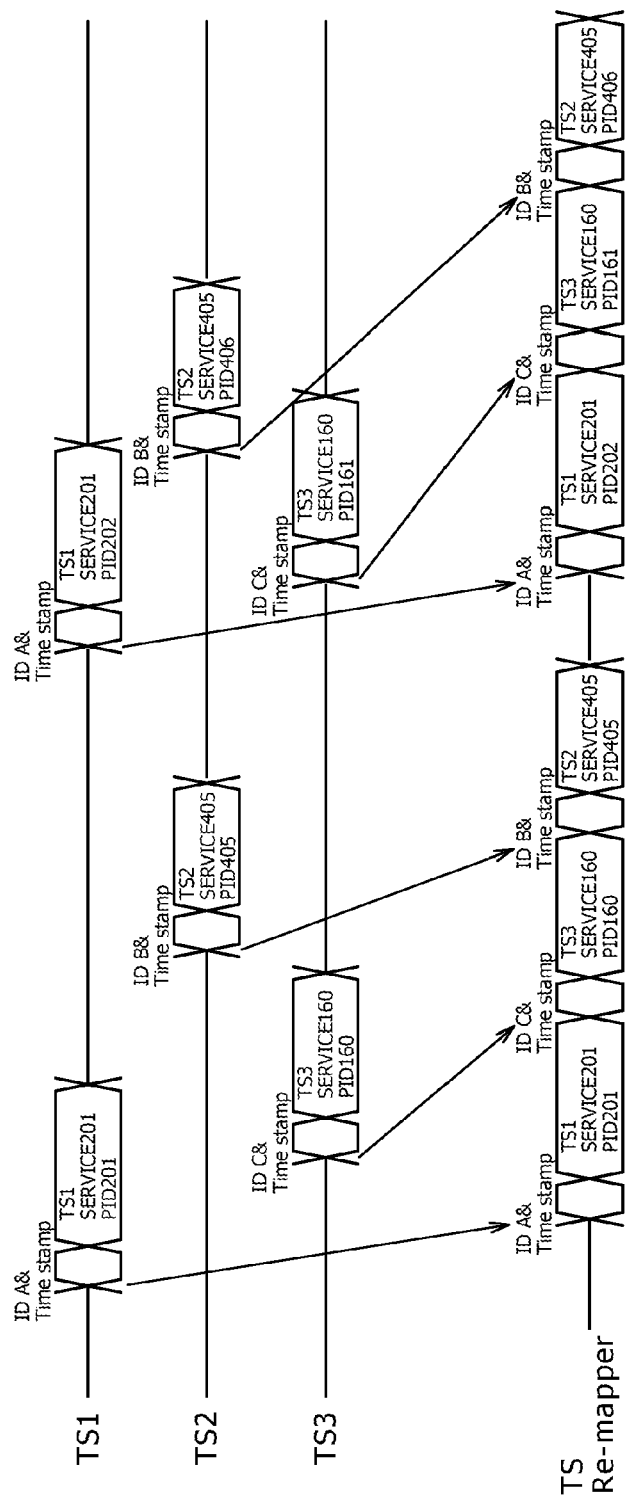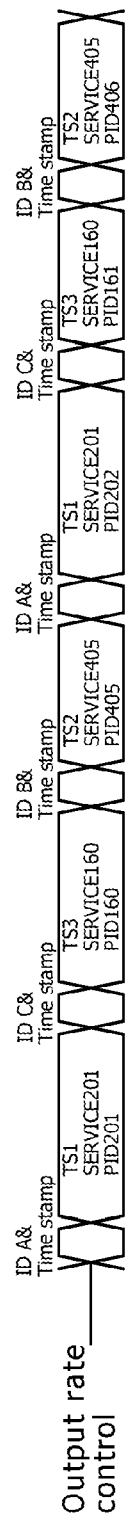
FIG. 4A
FIG. 4B

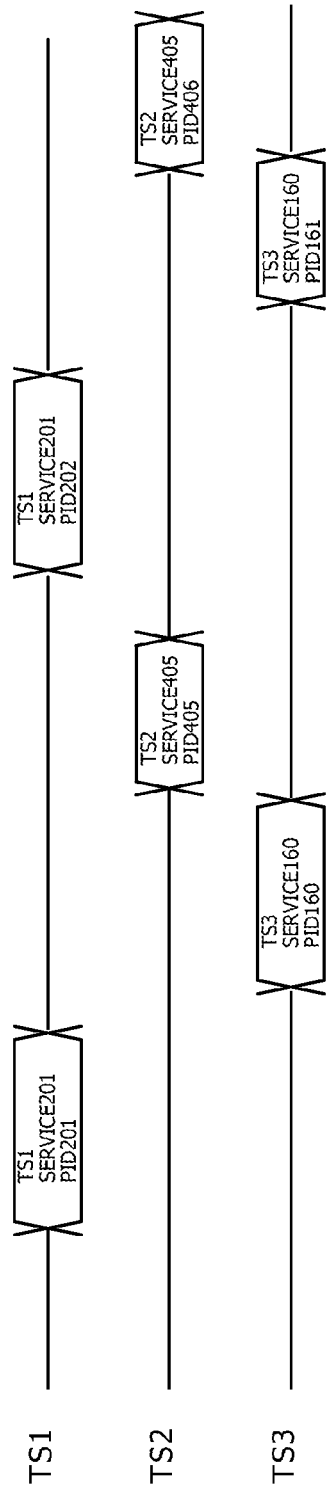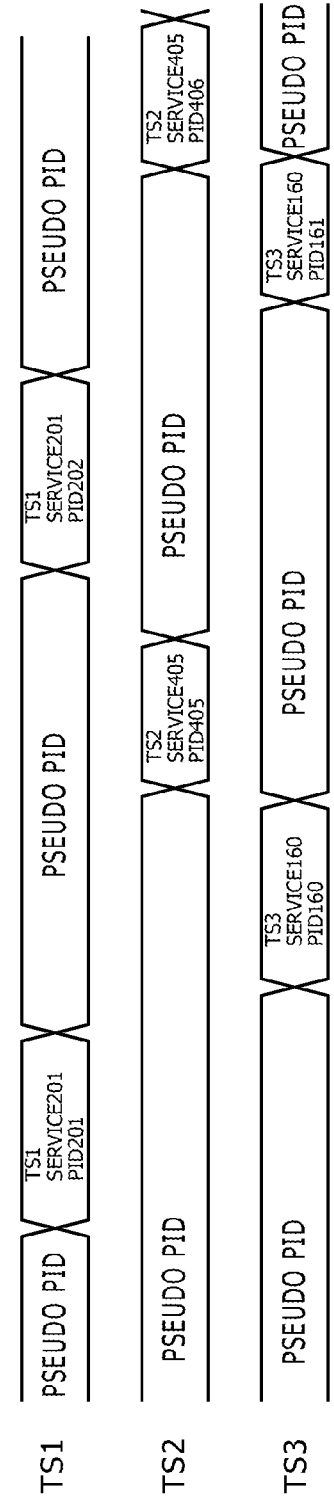

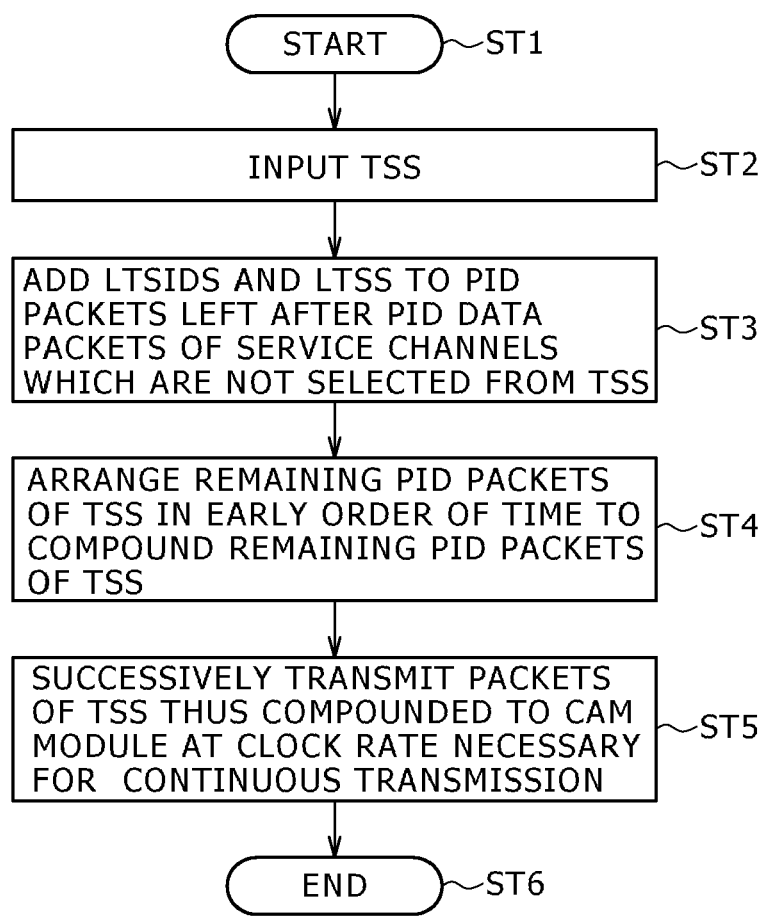

FIG.13

| BIT RATE | MAXIMUM DELAY AMOUNT | THE NUMBER OF NECESSARY BITS |
|---|---|---|
| 10Mbps | 451.2us | 14bits |
| 1Mbps | 4.512ms | 17bits |
| 100kbps | 45.12ms | 21bits |
| 15.04kbps | 300ms | 23bits |

FIG.17

| BIT RATE | MAXIMUM DELAY AMOUNT | THE NUMBER OF NECESSARY BITS |
|---|---|---|
| 10Mbps | 300.8us | 13bits |
| 1Mbps | 3.008ms | 17bits |
| 100kbps | 30.08ms | 20bits |
| 15.04kbps | 200ms | 23bits |

FIG. 18

| INSERTION PORTION | Pre-Header/Footer | | | Continuity Counter | EFFECT | |
|---|---|---|---|---|---|---|
| INSERTION INFORMATION | LTSID | LTS | CRC | LTSID | CORRESPONDING BIT RATE | V1.3.1 COMPATIBILITY |
| PLAN 1 | - | 3.0 | - | 0.5 | 94.49Mbps | ○ |
| PLAN 2 | - | 4.0 | - | 0.5 | 94.00Mbps | ○ |
| PLAN 3 | 0.5 | 3.5 | - | | 94.00Mbps | × |

[Byte]

FIG.19

| INSERTION PORTION | | Pre-Header/Footer | | | Continuity Counter |
|---|---|---|---|---|---|
| INSERTION INFORMATION | LTSID | LTS | CRC | | LTSID |
| PLAN 4 | 0.5 | 3.5 | - | | 0.5 |
| PLAN 5 | 1.0 | 3.0 | - | | - |
| PLAN 6 | 0.5 | 3.0 | - | | - |
| PLAN 7 | 0.5 | 4.0 | - | | - |
| PLAN 8 | - | 3.5 | - | | 0.5 |
| PLAN 9 | - | 3.0 | 1.0 | | 0.5 |
| PLAN 10 | - | 4.0 | 1.0 | | 0.5 |
| PLAN 11 | 0.5 | 3.5 | 1.0 | | - |
| PLAN 12 | 0.5 | 3.5 | 1.0 | | 0.5 |
| PLAN 13 | 1.0 | 3.0 | 1.0 | | - |
| PLAN 14 | 0.5 | 3.0 | 1.0 | | - |
| PLAN 15 | 0.5 | 4.0 | 1.0 | | |
| ... | ... | ... | ... | | ... |

[Byte]

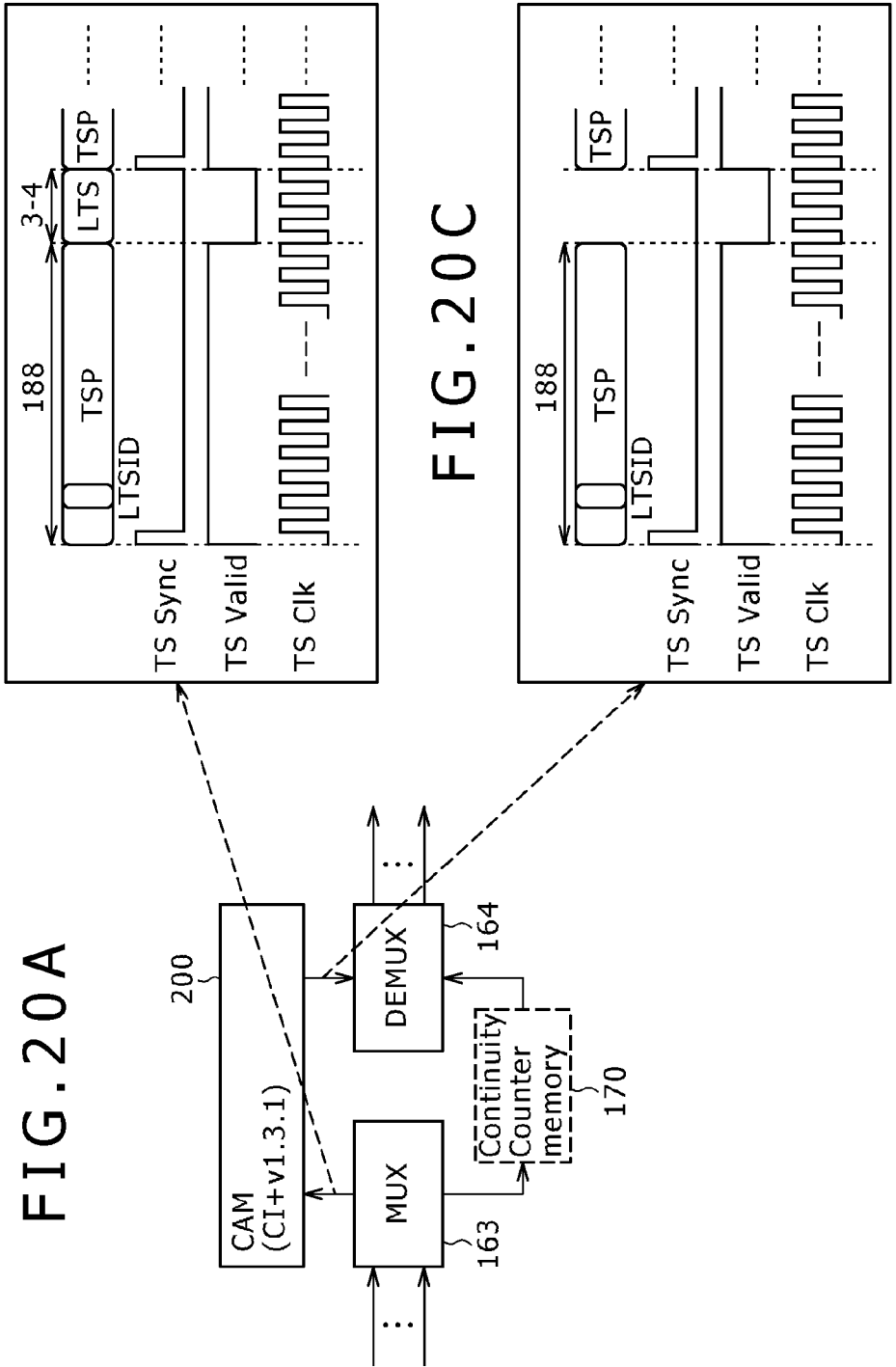

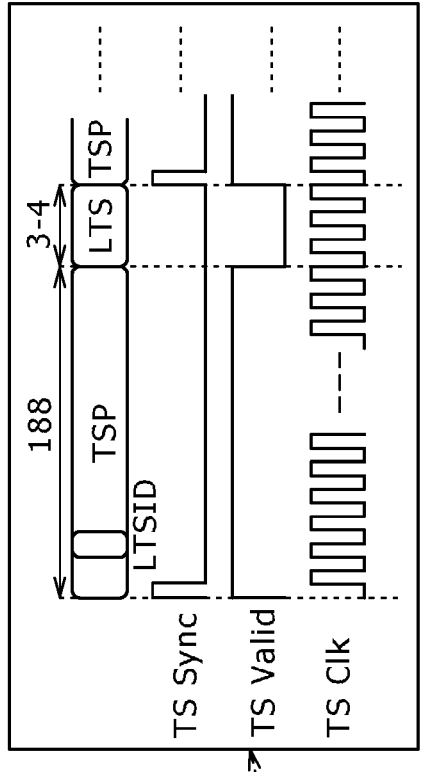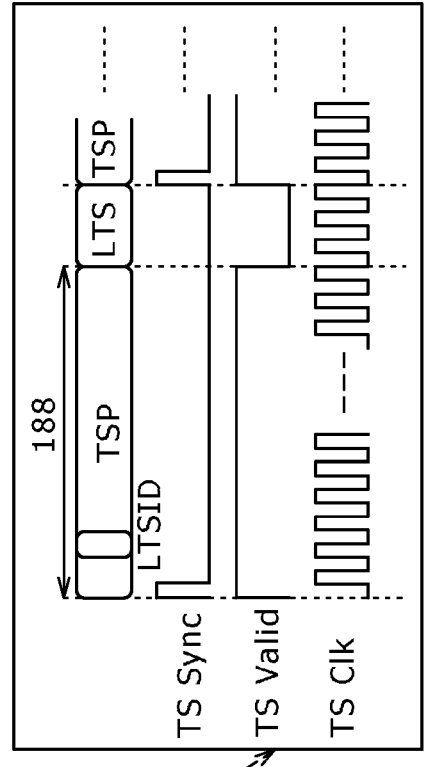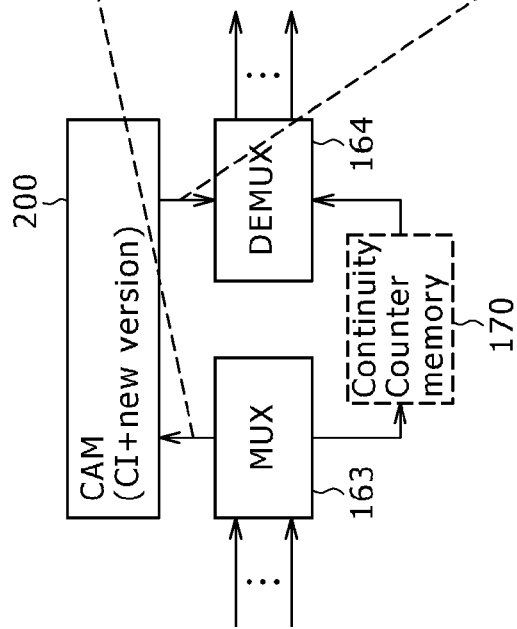

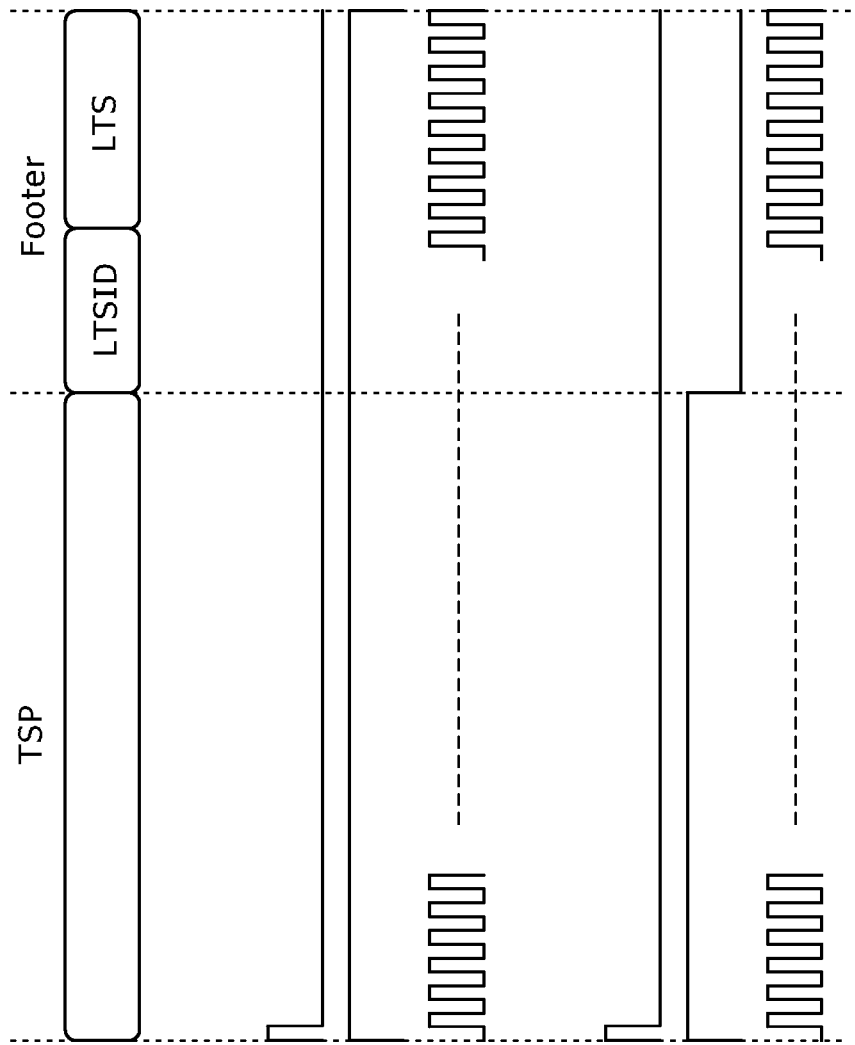

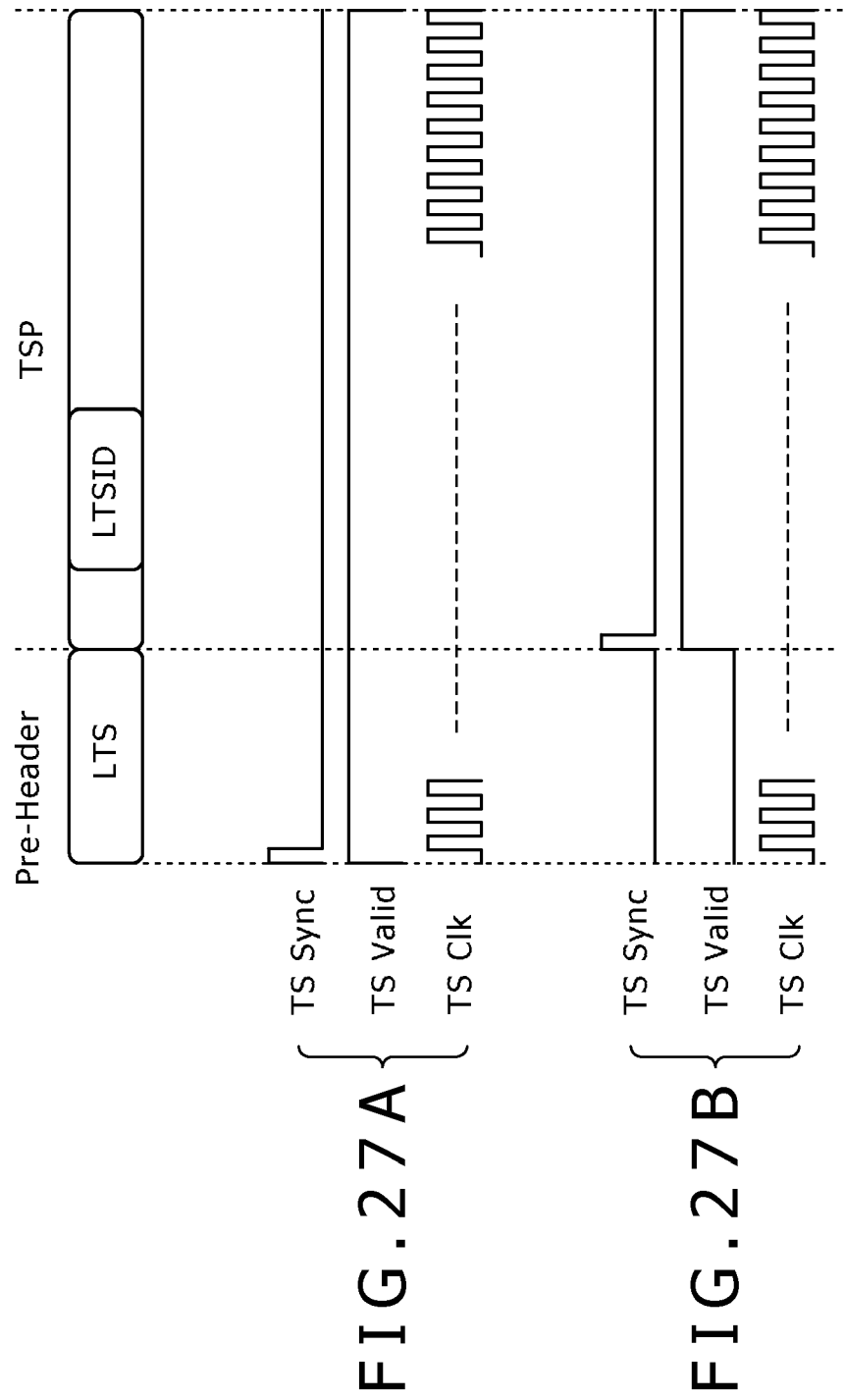

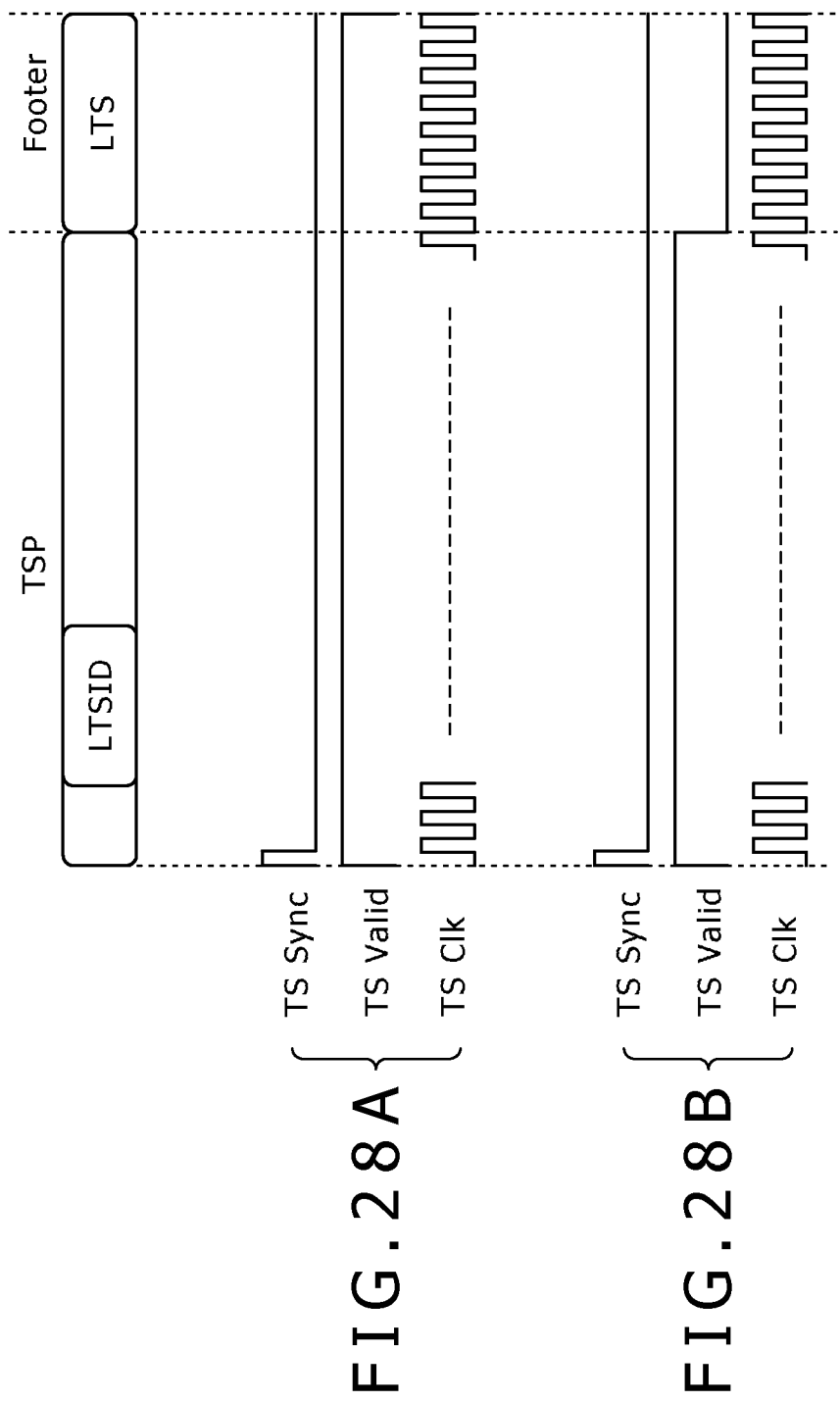

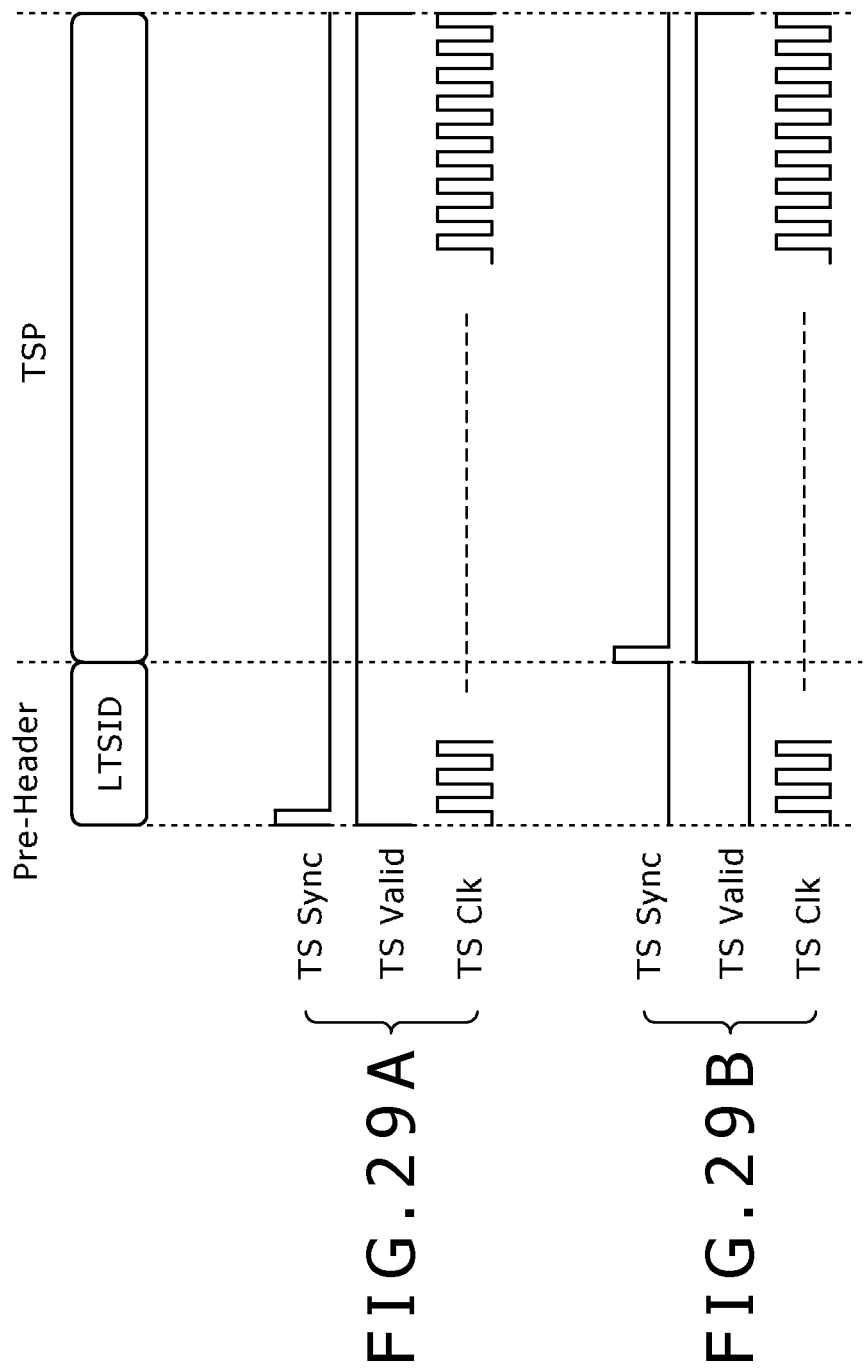

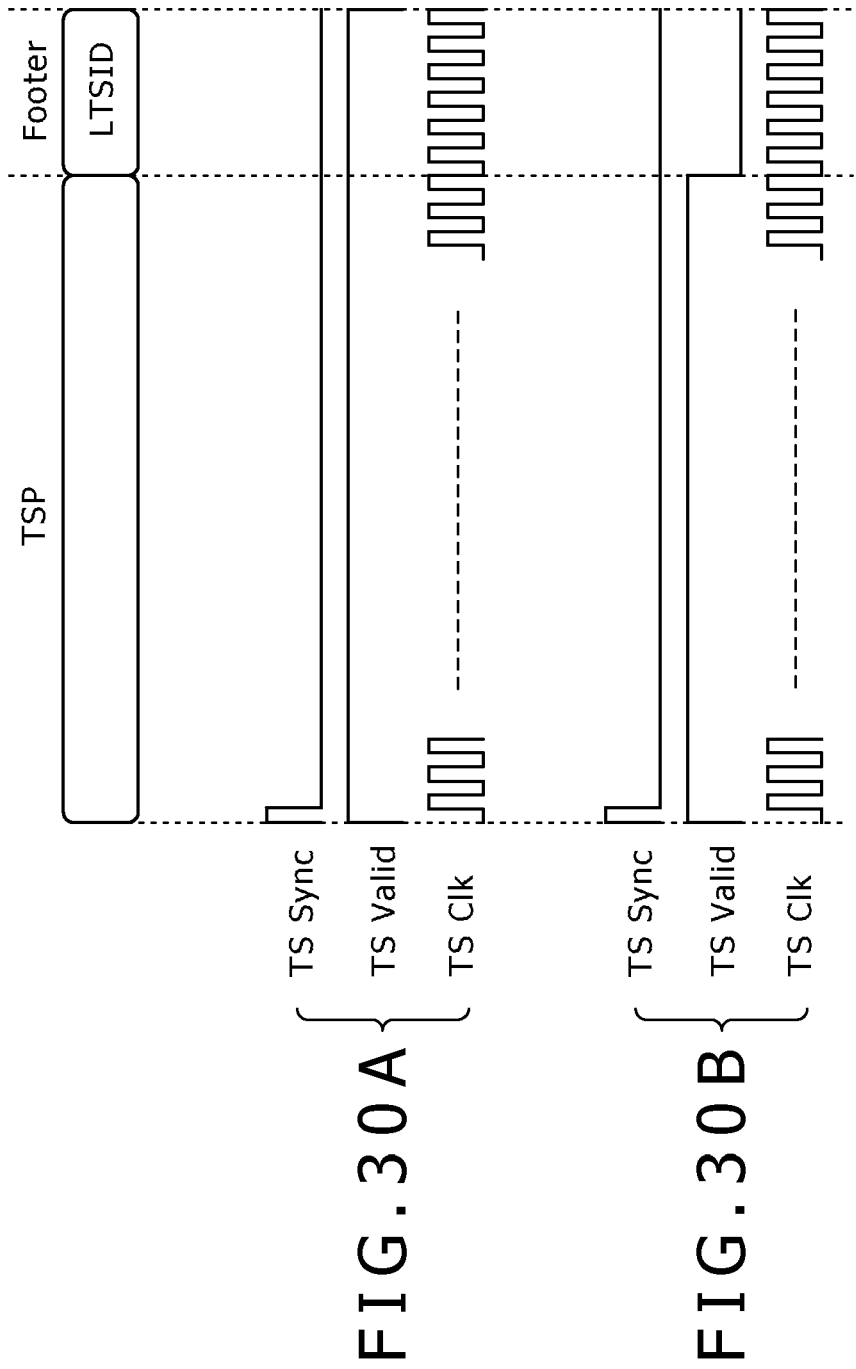

TRANSMITTING APPARATUS, TRANSMITTING METHOD, RECEIVING APPARATUS, RECEIVING METHOD, PROGRAM, AND ELECTRONIC APPARATUS

BACKGROUND

The present disclosure relates to a transmitting apparatus, a transmitting method, a receiving apparatus, a receiving method, a program, and an electronic apparatus. More particularly, the present disclosure relates to a transmitting apparatus for synthesizing plural transport streams into one stream, and transmitting the resulting one stream to an external apparatus, a transmitting method used in the same, a receiving apparatus, a receiving method used in the same, a program used in those, and an electronic apparatus including those.

For the purpose of responding to different Conditional Accesses (CA) when a television broadcasting is received, the standard which utilizes a conditional access mounted in a module through a Common Interface (CI) is issued and utilized. This technique, for example, is described in a Non-Patent Document 1 of CI Plus Specification vol. 3.1 (2011-09), and a Non-Patent Document 2 of DVB-CI EN50221.

SUMMARY

However, in that standard, an interface of a transport stream which can be used on the Common Interface (CI) is provided in each input and output side. Therefore, TS packets of plural transport streams need to be multiplexed in a time division manner into one stream, thereby carrying out transmission with a CAM module.

The present disclosure has been made in order to solve the problems described above, and it is therefore desirable to provide a transmitting apparatus which is capable of synthesizing plural transport streams into one stream, thereby making it possible to satisfactorily transmit the resulting one stream with an external apparatus, a transmitting method used in the same, a receiving apparatus, a receiving method used in the same, a program used in those, and an electronic apparatus including those.

In order to attain the desire described above, according to an embodiment of the present disclosure, there is provided a transmitting apparatus including:

a stream inputting portion inputting plural transport streams;

an information adding portion adding additional information containing therein a stream identifier used to identify at least corresponding transport stream to respective transport stream packets of the plural transport streams thus inputted;

a stream synthesizing portion synthesizing the plural transport streams in which the additional information is added to each of the transport stream packets, thereby obtaining one stream; and a stream transmitting portion transmitting the resulting one stream to an external apparatus, in which the information adding portion adds the additional information forward, backward or midway with respect to each of the transport stream packets.

In the embodiment described above of the present disclosure, the plural transport streams are inputted by the stream inputting portion. Also, the additional information containing therein the stream identifier used to identify the at least corresponding transport stream is added to the respective transport stream packets of the plural transport streams thus inputted by the information adding portion. In this case, the additional information is added forward, backward, and midway with respect to each of the transport stream packets.

The plural transport streams in which the additional information is added to each of the transport stream packets are synthesized by the stream synthesizing portion, thereby obtaining on stream. Also, the resulting one stream is transmitted to the external apparatus by the stream transmitting portion. For example, the stream transmitting portion may transmit the one stream to the Conditional Access Module (CAM) as the external apparatus through either a DVB-CI common interface, or a CI+common interface.

As has been described, in the embodiment of the present disclosure, when the plural transport streams are synthesized into one stream which is in turn transmitted to the external apparatus, the additional information containing therein the stream identifier used to identify the at least corresponding transport stream is added forward, backward or midway with respect to each of the transport stream packets. For this reason, when the one stream is returned back from the external apparatus, the plural transport streams can be exactly and readily reconstructed based on the additional information.

It is noted that in the embodiment of the present disclosure, preferably, the information adding portion may insert the stream identifier contained in the additional information into a continuity counter area within a header of the transport stream packet. In this case, even when the external apparatus deals with only the transport stream packet as a valid signal period of time, each of the transport stream packets contained in the one stream returned back from the external apparatus is placed in a state in which each of the transport stream packets has a stream identifier within the header. For this reason, even in this case, the plural transport streams can be exactly and readily reconstructed.

In addition, in the embodiment described above of the present disclosure, for example, preferably, the additional information may contain a time stamp corresponding to time of input as well as the stream identifier. In this case, when the plural transport streams are reconstructed from one stream returned back from the external apparatus, time positions of the transport stream packets can be returned back to the original states before the synthesis in correspondence to the time stamps added, respectively.

In this case, for example, preferably, the information adding portion may insert the stream identifier into a continuity counter area within a header of the transport stream packet, and may add the time stamp either forward or backward with respect to the transport stream. In addition, in this case, for example, preferably, the information adding portion may add the stream identifier and the time stamp as a unit either forward or backward with respect to the transport stream packet.

In addition, in the embodiment described above of the present disclosure, for example, preferably, when one stream is transmitted to the external apparatus, the stream transmitting portion may transmit a valid signal representing a valid signal period of time to the external apparatus, and the valid signal may represent only a period of time of transport stream packet as the valid signal period of time. In this case, even when a part of or all of the additional information is added either forward or backward with respect to the transport stream packet, it is possible to avoid that a bad influence in exerted on the external apparatus complying with the existing version in which only the transport stream packet is dealt with as the valid signal period of time.

In addition, in the embodiment described above of the present disclosure, for example, preferably, when one stream is transmitted to the external apparatus, the stream transmitting portion may transmit a valid signal representing a valid signal period of time to the external apparatus in correspondence to each of transport stream packets, and when a part of or all of the additional information is added either forward or backward with respect to the transport stream packet, the valid signal may represent each of a period of time of the transport stream packet, and a period of time of the additional information added either forward or backward with respect to the transport stream packet as a valid signal period of time. In this case, when a part of or all of the additional information is added either forward or backward with respect to the transport stream packet, the external apparatus becomes easy to recognize not only the period of time of the transport stream packet, but also the period of time of the additional information thereof as the valid signal period of time.

In addition, in the embodiment described above of the present disclosure, for example, preferably, a time stamp may be set as an absolute time based on a reference clock which is PCR-recovered. In this case, when video data is recorded and is then reproduced, the time stamp can be utilized as it is.

In addition, in the embodiment described above of the present disclosure, for example, preferably, the time stamp may be set as a relative time representing a time difference from the input to the synthesis of the plural transport streams. In this case, the regulation of an upper limit delay amount of the external apparatus, for example, a CAM module is unnecessary, and thus it is possible to set the number of necessary bits in the time stamp.

In the embodiment described above of the present disclosure, for example, preferably, the stream transmitting portion may transmit the one stream to the external apparatus through either a DVB-CI common interface or a CI+common interface; and the external apparatus may be a conditional access module executing descramble processing.

According to another embodiment of the present disclosure, there is provided a transmitting method including:

inputting plural transport streams;

adding additional information containing therein a stream identifier used to identify at least corresponding transport streams to respective transport stream packets of the plural transport stream thus inputted;

synthesizing the plural transport streams in which the additional information is added to each of transport stream packets, thereby obtaining one stream; and transmitting the resulting one stream to an external apparatus, in which in the addition of the additional information, the additional information is added forward, backward or midway with respect to each of the transports stream packet.

According to still another embodiment of the present disclosure, there is provided a program in accordance with which a computer is caused to function as:

a stream inputting section inputting plural transport streams;

an information adding section adding additional information containing therein a stream identifier used to identify at least corresponding transport stream to respective transport stream packets of the plural transport streams thus inputted;

a stream synthesizing section synthesizing the plural transport streams in which the additional information is added to each of the transport stream packets, thereby obtaining one stream; and a stream transmitting section transmitting the resulting one stream to an external apparatus, in which the information adding section adds the additional information forward, backward or midway with respect to each of the transport stream packets.

According to yet another embodiment of the present disclosure, there is provided a receiving apparatus including:

a stream receiving portion successively receiving transport stream packets to each of which additional information containing therein a stream identifier used to identify at least corresponding transport stream is added from an external apparatus; and a stream reconstructing portion reconstructing plural transport streams based on the additional information from the transport stream packets, in which the additional information is added forward, backward or midway with respect to each of the transport stream packets.

In yet another embodiment of the present disclosure, the transport stream packets to each of which the additional information containing therein the stream identifier used to identify at least corresponding transport stream are successively received by the stream receiving portion. In this case, the additional information is added forward, backward or midway with respect to each of the transport stream packets. Also, the plural transport streams are reconstructed based on the additional information from the transport stream packets by the stream reconstructing portion. In this case, for example, a digital interface may be either a DVB-CI common interface or a CI+common interface, and the external apparatus may be a Conditional Access Module (CAM) for executing descrambling processing.

As has been described, in yet another embodiment described above of the present disclosure, the additional information containing therein the stream identifier used to identify at least corresponding transport stream is added forward, backward or midway with respect to each of the transport stream packets, and the plural transport streams are reconstructed based on the additional information. For this reason, when one stream in which the transport stream packets of the plural transport streams are contained in a mixture style is returned back from the external apparatus, it is possible to exactly and readily reconstruct the plural transport streams based on the additional information.

In yet another embodiment described above of the present disclosure, for example, preferably, the stream identifier contained in the additional information may be inserted into a continuity counter area within a header of the transport stream packet.

It is noted that in yet another embodiment described above of the present disclosure, for example, preferably, a time stamp representing an original time position in the transport stream may be added together with the stream identifier to the additional information, and the stream reconstructing portion may sort the transport stream packets into the streams in accordance with the stream identifier, and may dispose the transport stream packets in time positions corresponding to the time stamps added in the streams, respectively, thereby reconstructing the plural transport streams. In this case, the time positions of the transport stream packets contained in the plural transport streams reconstructed can be returned back to the original states before the synthesis of the plural transport streams.

In addition, in yet another embodiment described above of the present disclosure, for example, preferably, the receiving apparatus may further include a substituting portion returning values in the continuity counter areas of the headers of the transport stream packets composing the plural transport streams reconstructed back to original values, respectively. In this case, even in the case where the stream identifier is inserted into the continuity counter area of each of the headers of the transport stream packets when the plural transport streams are synthesized into one stream, finally, in the plural transport streams reconstructed, the values of the continuity counter areas of the headers of the transport stream packets can be returned back to the original states, respectively. Also, it is possible to avoid the influence due to that the values in the continuity counter areas are changed.

In yet another embodiment described above of the present disclosure, for example, preferably, the stream receiving portion may receive the transport stream packets from the external apparatus through either a DVB-CI common interface or a CI+common interface; and the external apparatus may be a conditional access module executing descrambling processing.

According to a further embodiment of the present disclosure, there is provided a receiving method including:

successively receiving transport stream packets to each of which additional information containing therein a stream identifier used to identify at least corresponding transport stream is added from an external apparatus; and reconstructing plural transport streams based on the additional information from the transport stream packets, in which the additional information is added forward, backward or midway with respect to each of the transport stream packets.

According to an even further embodiment of the present disclosure, there is provided a program in accordance with which a computer is caused to function as:

a stream receiving section successively receiving transport stream packets to each of which additional information containing therein a stream identifier used to identify at least corresponding transport stream is added from an external apparatus; and a reconstructing section reconstructing plural transport streams based on the additional information from the transport stream packets, in which the additional information is added forward, backward or midway with respect to each of the transport stream packets.

In addition, according to a still further embodiment of the present disclosure, there is provided an electronic apparatus including:

a transmitting apparatus and a receiving apparatus, the transmitting apparatus including a stream inputting portion inputting plural transport streams;

an information adding portion adding additional information containing therein a stream identifier used to identify at least corresponding transport stream to respective transport stream packets of the plural transport streams thus inputted;

a stream synthesizing portion synthesizing the plural transport streams in which the additional information is added to each of the transport stream packets, thereby obtaining one stream; and a stream transmitting portion transmitting the resulting one stream to an external apparatus, in which the information adding portion adds the additional information forward, backward or midway with respect to each of the transport stream packets; and the receiving apparatus including a stream receiving portion successively receiving transport stream packets to each of which additional information is added from an external apparatus; and a stream reconstructing portion reconstructing plural transport streams based on the additional information from the transport stream packets.

As set forth hereinabove, according to the present disclosure, the plural transport streams can be synthesized into one stream, thereby making it possible to transmit the resulting one stream to the external apparatus.

BRIEF DESCRIPTION OF THE DRAWINGS

FIGS. 3A and 3B are respectively a diagram showing an example of a structure of PID packets of transport streams fetched in an input buffer, and a diagram showing an example of a structure of PID packets which is not unnecessary after the PID data packets other than a service channel(s) selected (tuned) are removed away;

FIGS. 4A and 4B are respectively a diagram showing an example of a structure of PID packets which are not unnecessary of transport streams to each of which an LTSID (stream identifier) and an LTS (time stamp) held in a dual-port memory are added and a stream which is obtained by compounding the PID packets, and a diagram showing an example of a structure of packets which are continuously transmitted to a CAM module;

FIGS. 6A and 6B are respectively a diagram showing an example of a structure of transport streams which are reconstructed by a PID timing adjuster, and a diagram showing an example of a structure of transport streams into which pseudo PID packets are inserted and which are finally outputted;

FIG. 7 is a flow chart showing a processing procedure in a common interface controller when PID packets of transport streams are compounded to be transmitted as one stream to a CAM module;

FIG. 13 is a diagram showing a relationship between a bit rate and the number of necessary bits when a maximum amount of delay is three packets;

FIG. 17 is a diagram showing a relationship between a bit rate and the number of necessary bits when a maximum amount of delay is two packets;

FIG. 18 is a diagram showing an example of portions of insertion of the LTSID (stream identifier) and the LTS (time stamp), and the number of bytes;

FIG. 19 is a diagram showing another example of the portions of insertion of the LTSID (stream identifier) and the LTS (time stamp), and the number of bytes;

FIGS. 20A, 20B, and 20C are respectively a block diagram, and diagrams explaining an effect due to that the LTSID is inserted into an area of a continuity counter;

FIGS. 21A, 21B, and 21C are respectively a block diagram, and diagrams explaining a TS valid signal;

FIGS. 26A and 26B are respectively time charts showing an example of generation (corresponding to a pattern (4)) of the TS Sync signal, the TS Valid signal, and the TS Clock signal;

FIGS. 27A and 27B are respectively time charts showing an example of generation (corresponding to a pattern (5)) of the TS Sync signal, the TS Valid signal, and the TS Clock signal;

FIGS. 28A and 28B are respectively time charts showing an example of generation (corresponding to a pattern (6)) of the TS Sync signal, the TS Valid signal, and the TS Clock signal;

FIGS. 29A and 29B are respectively time charts showing an example of generation (corresponding to a pattern (7)) of the TS Sync signal, the TS Valid signal, and the TS Clock signal;

FIGS. 30A and 30B are respectively time charts showing an example of generation (corresponding to a pattern (8)) of the TS Sync signal, the TS Valid signal, and the TS Clock signal.

DETAILED DESCRIPTION OF THE PREFERRED EMBODIMENTS

Hereinafter, embodiments of the present disclosure will be described in detail with reference to the accompanying drawings. It is noted that the description will be given below in accordance with the following order.

1. Digital Broadcasting Receiving System
2. First Embodiment (Transmitting Apparatus)
3. Second Embodiment (Program)
4. Third Embodiment (Receiving Apparatus)
5. Fourth Embodiment (Program)
6. Fifth Embodiment (Electronic Apparatus)
7. Modified Changes

1. Digital Broadcasting Receiving System

[Configuration of Digital Broadcasting Receiving System]

Figure 1:
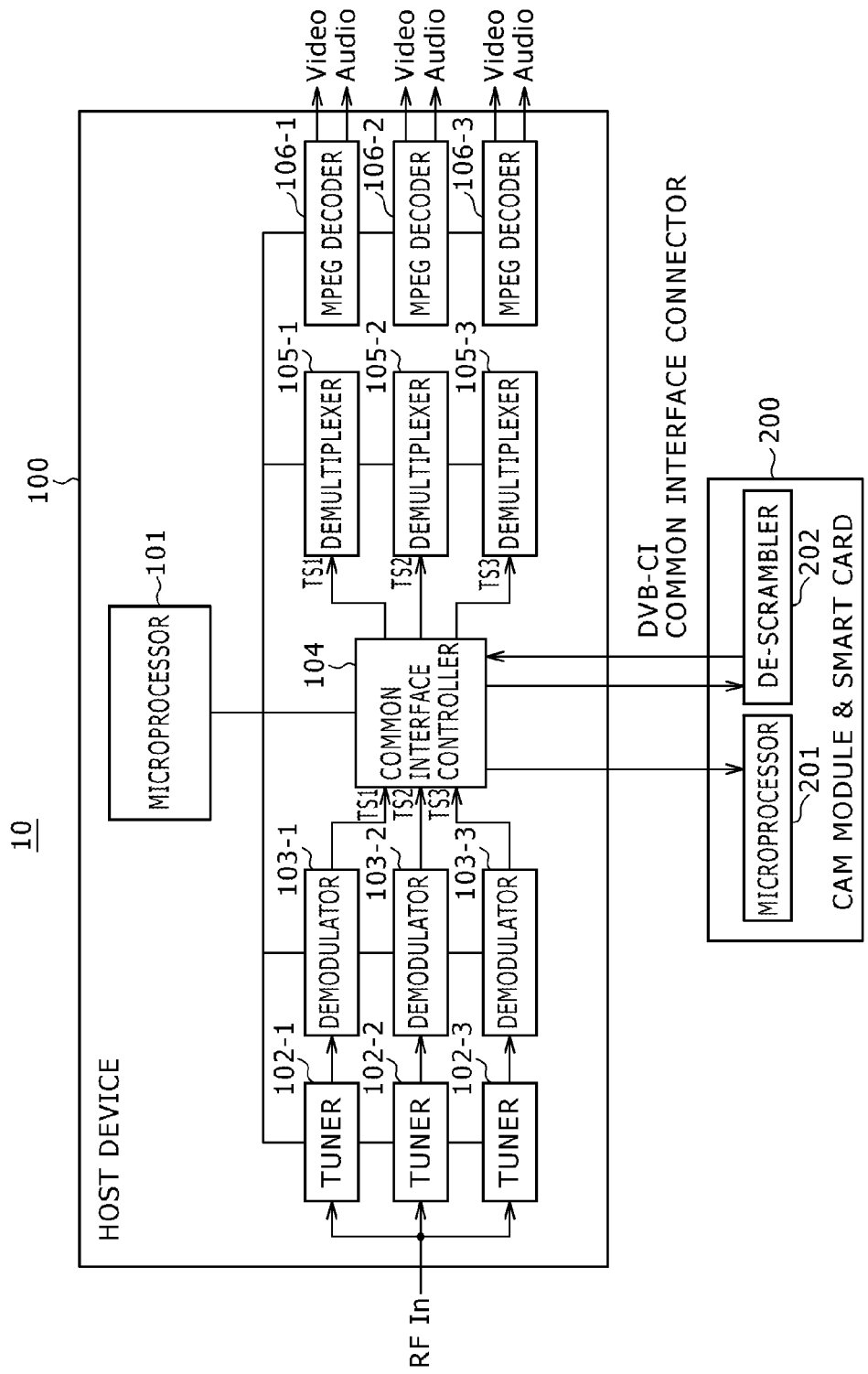
FIG. 1 is a block diagram showing a configuration of a receiving system for a digital broadcasting to which the present disclosure is applied.

FIG. 1 shows a configuration of a receiving system 10 for a digital broadcasting to which the present disclosure is applied. The receiving system 10 is composed of a host device 100 and a CAM module 200. The host device 100 is a television set (TV set), a set-top box or the like.

The host device 100 includes a microprocessor 101, tuners 102-1, 102-2, and 102-3, and demodulators 103-1, 103-2, and 103-3. In addition, the host device 100 includes a common interface controller 104, and demultiplexers 105-1, 105-2, and 105-3. Also, the host device 100 includes MPEG decoders 106-1, 106-2, and 106-3.

The microprocessor 101 controls operations of the individual portions of the host device 100. The tuners 102-1, 102-2, and 102-3 receive RF modulated signals of transport streams TS1, TS2, and TS3 which are transmitted from broadcasting stations, respectively. Also, the tuners 102-1, 102-2, and 102-3 down-convert frequencies of the RF modulated signals into intermediate frequencies IF modulated signals of which are in turn outputted in order to input the resulting IF modulated signals to the demodulators 103-1, 103-2, and 103-3, respectively. The demodulators 103-1, 103-2, and 103-3 demodulate the IF modulated signals whose intermediate frequencies are obtained through the down-conversion, thereby obtaining transport streams TS1, TS2, and TS3 each having base band.

The common interface controller 104 exchanges the transport streams TS1, TS2, and TS3 obtained in the demodulators 103-1, 103-2, and 103-3, respectively, with a CAM module 200, in a ward, transmits/receives the transport streams TS1, TS2, and TS3 obtained in the demodulators 103-1, 103-2, and 103-3 to/from the CAM module 200. The common interface controller 104 and the CAM module 200 are connected to each other by a DVB-CI interface controller.

PID packets (TSP: Transport Stream Packets) of plural service channels are contained in the transport streams, respectively, in a time division style. The common interface controller 104 carries out the exchange with the exception of the PID data packets of the service channels which are not selected (tuned) by the transport streams, respectively. As a result, a transmission bit rate is reduced. A detailed configuration of the common interface controller 104 will be further described later.

The demultiplexers 105-1, 105-2, and 105-3 extract the PID data packets of the service channels which are selected (tuned) from the transport streams TS1, TS2, and TS3, respectively, which are obtained in the common interface controller 104. The PID data packet is a PID data packet of video data and audio data. The MPEG decoders 106-1, 106-2, and 106-3 demodulate elementary streams composed of the PID data packets which are extracted in the demultiplexers 105-1, 105-2, and 105-3, respectively, thereby obtaining both of the video data and the audio data.

The CAM module 200 is an attachment device which is fitted into a DVB-CI common interface connector of the host device 100 in order to execute the descrambling processing. A smart card such as a magnetic card or an IC card in which viewing subscriber information, contract period information, and the like are recorded is inserted into the CAM module 200, and in this state, the CAM module 200 is used.

The CAM module 200 includes a microprocessor 201 and a de-scrambling portion 202. The CAM module 200 receives PID packets which have been sent thereto from the common interface controller 104 of the host device 100 through the DVB-CI common interface, and subjects de-scrambling processing to the PID packets thus received. After that, the CAM module 200 transmits the PID packets to the common interface controller 104 of the host device 100.

An operation of the receiving system 10 shown in FIG. 1 will now be simply described. The RF modulated signals of the transport streams TS1, TS2, and TS3 which have been sent from the broadcasting stations are received by the tuners 102-1, 102-2, and 102-3, respectively. Also, in the tuners 102-1, 102-2, and 102-3, the RF modulated signals received thereat are down-converted into the intermediate frequencies, and the resulting IF demodulated signals having the intermediate frequencies are then supplied to the demodulators 103-1, 103-2, and 103-3, respectively. In the demodulators 103-1, 103-2, and 103-3, the IF modulated signals whose intermediate frequencies are obtained through the down-conversion are demodulated, thereby obtaining the transport streams TS1, TS2, and TS3 each having the base band, respectively. The resulting transport streams TS1, TS2, and TS3 are supplied to the common interface controller 104.

In the common interface controller 104, the PID packets of the transport streams TS1, TS2, and TS3 which have been supplied from the demodulators 103-1, 103-2, and 103-3 are compounded. Also, the PID packets thus compounded are transmitted from the common interface controller 104 to the CAM module 200 through the DVB-CI common interface. In this case, the PID data packets which are not selected (tuned) are excluded from the transport streams, respectively.

In the CAM module 200, the PID packets which have been sent from the common interface controller 104 of the host device 100 through the DVB-CI common interface are received and are then subjected to the de-scrambling processing. After that, the PID packets are transmitted from the CAM module 200 to the common interface controller 104 of the host device 100 through the DVB-CI common interface.

In the common interface controller 104, the PID packets which have been sent from the CAM module 200 through the DVB-CI common interface are received. Also, in the common interface controller 104, the PID packets are sorted into the streams, respectively, thereby reconstructing the transport streams TS1, TS2, and TS3. The transport streams TS1, TS2, and TS3 thus reconstructed are supplied to the demultiplexers 105-1, 105-2, and 105-3, respectively.

In the demultiplexers 105-1, 105-2, and 105-3, the PID data packets of the service channels which are selected (tuned) are extracted from the transport streams TS1, TS2, and TS3 which have been supplied from the common interface controller 104. The PID data packets of the video data and the audio data which are extracted from the demultiplexers 105-1, 105-2, and 105-3 are supplied to the MPEG decoders 106-1, 106-2, and 106-3, respectively.

In the MPEG decoders 106-1, 106-2, and 106-3, the demodulating processing is executed for the elementary streams of the video data and the audio data which are composed of the PID data packets of the video data and the audio data. Also, the video data and the audio data of the service channels which are selected (tuned) are outputted from the MPEG decoders 106-1, 106-2, and 106-3, respectively.

[Detailed Configuration of Common Interface Controller]

Figure 2:
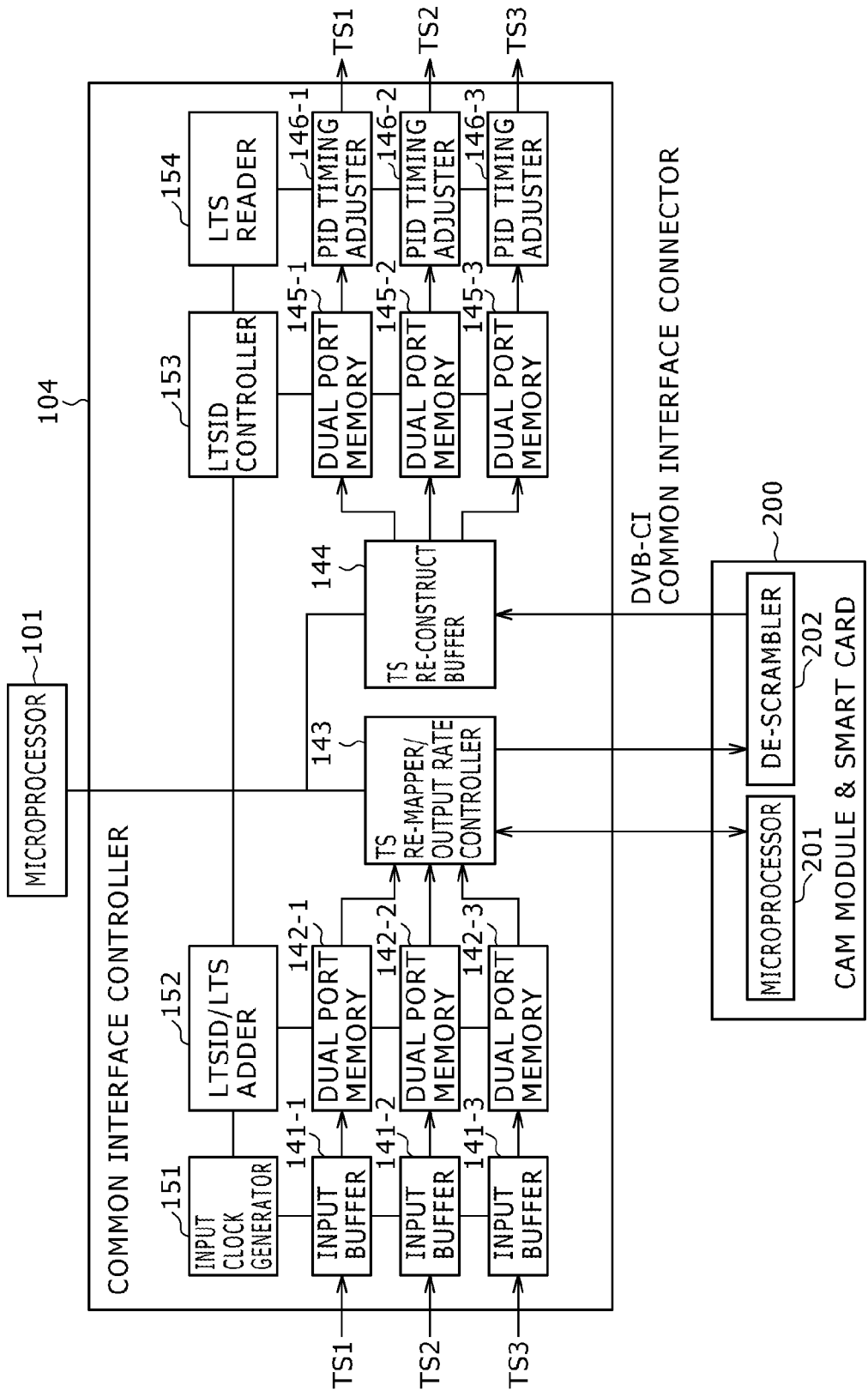
FIG. 2 is a block diagram showing a detailed configuration of a common interface controller composing the receiving system shown in FIG. 1.

Next, a description will now be given with respect to a detailed configuration of the common interface controller 104 with reference to FIG. 2. FIG. 2 shows the detailed configuration of the common interface controller 104. The common interface controller 104 includes input buffers 141-1, 141-2, and 141-3, and dual port memories 142-1, 142-2, and 142-3. In addition, the common interface controller 104 includes a TS re-mapper/output rate controller 143 and a TS re-construct buffer 144.

In addition, the common interface controller 104 includes dual port memories 145-1, 145-2, and 145-3, and PID timing adjusters 146-1, 146-2, and 146-3. In addition, the common interface controller 104 includes an input clock generator 151 and a Local TS ID (LTSID)/Local Time Stamp (LTS) adder (Local TS ID/Time Stamp Adder) 152. In addition thereto, the common interface controller 104 includes a Local TS ID (LTSID) controller 153, and an LTS (Local Time Stamp) reader 154.

The input buffers 141-1, 141-2, and 141-3 temporarily store therein the transport streams TS1, TS2, and TS3 inputted thereto, respectively. Relative times of the PID packets (TSPs: Transport Stream Packets) of the transport streams which are fetched in the input buffers 141-1, 141-2, and 141-3, respectively, can be managed by storing a count value of a clock signal which is generated in an input clock generator 151.

The LTSID/LTS adder 152 adds both of the LTSID and the LTS by using the dual port memories 142-1, 142-2, and 142-3, and excludes the PID data packets of the service channels which are not selected (tuned) from the transport streams TS1, TS2, and TS3, respectively.

Here, the LTSID is a stream identifier for identifying the transport stream in accordance the PID packet concerned. In addition, the LTS is time information which is obtained based on the clock signal generated in the input clock generator 151 and which corresponds to the input time at which the PID packet concerned is inputted to the input buffer. For example, the input clock generator 151 is a free running clock generator and outputs a count value of the clock signal having 27 MHz. In addition, for example, the input clock generator 151 outputs a count value of a reference clock signal having 27 MHz which has been PCR-recovered.

In the digital broadcasting receiving system of the present disclosure, the time information as the LTS is set either as the absolute time or as the relative time. For example, the count value, of the clock signal generated in the input clock generator 151, which corresponds to the input time at which the PID packet is inputted to the input buffer is utilized as the absolute time as it is. In addition, for example, a difference in count value, of the clock signal generated in the input clock generator 151, which corresponds to a difference between the input time at which the PID packet is inputted to the input buffer, and the composite time in a multiplexer (not shown) in the TS re-mapper/output rate controller 143 is utilized as the relative time.

In the case where the time information as the LTS is set as the absolute time based on the reference clock which has been PCR-recovered, when the audio signal is recorded and is then reproduced, the LTS can be utilized as it is. On the other hand, in the case where the time information as the LTS is set as the relative time, the regulation of the upper limit delay amount for the CAM module is unnecessary and thus the number of necessary bits can be set in the LTS.

The TS re-mapper/output rate controller 143 successively reads out the PID packets to each of which the LTSID (stream identifier), and the LTS (time stamp) are added in the ascending order of time from the dual port memories 142-1, 142-2, and 142-3 to compound the PID packets into one stream. Also, the packets of the transport streams TS1, TS2, and TS3 contained in this stream are successively transmitted to the CAM module 200 through the DVB-CI common interface.

In this case, the TS re-mapper/output rate controller 143 determines a clock rate necessary for the continuous transmission from an entire amount of data, and continuously transmits each of the packets to the CAM module 200. By carrying out the continuous transmission in such a manner, it is possible to stabilize the operation of the synchronous system of the receiving circuit in the CAM module 200.

In addition, in correspondence to the operation for transmitting each of the PID packets to the CAM module 200, the TS re-mapper/output rate controller 143 transmits stream information and service channel information on the PID packet concerned. Here, the stream information represents which of the transport streams the PID packet belongs to, and the service channel information represents which of the service channels the PID packet belongs to.

The stream information and the service channel information of the PID packet concerned are transmitted in accordance with the transmission of the PID packets in such a manner, whereby there is offered the following effect. That is to say, even when the correction of the SI/PSL information is not carried out along with the processing for excluding the unnecessary PID data packets, it is possible to properly recognize the PID packet of what kind of service channel is sent in the CAM module 200.

The TS re-construct buffer 144 successively receives the PID packets of the transport streams TS1, TS2, and TS3 from the CAM module 200 through the DVB-CI common interface, and then temporarily stores therein the PID packets of the transport streams TS1, TS2, and TS3. As described above, the LTSID (stream identifier) and the LTS (time stamp) are added to each of the PID packets.

The LTSID controller 153 sorts the PID packets stored in the TS re-construct buffer into the transport streams TS1, TS2, and TS3, respectively, in accordance with the LTSIDs added to the PID packets. Also, the LTSID controller 153 writes the PID packets sorted into the transport streams to the dual port memories 145-1, 145-2, and 145-3, respectively.

An LTS reader 154 reads out the LTSs added to the PID packets which have been written to the dual port memories 145-1, 145-2, and 145-3, respectively. The PID timing adjusters 146-1, 146-2, and 146-3 reconstruct the transport streams TS1, TS2, and TS3, respectively, based on the results of reading out the LTSs described above, and output the transport streams TS1, TS2, and TS3 thus reconstructed, respectively. That is to say, the PID timing adjusters 146-1, 146-2, and 146-3 read out and output the PID packets written to the dual port memories 145-1, 145-2, and 145-3, respectively, in such a way that the PID packets are disposed in the time positions corresponding to the LTSs added to the PID packets, respectively.

In this case, the PID timing adjusters 146-1, 146-2, and 146-3 insert pseudo PID packets of the PIDs different from the PID packets into the time positions, respectively, where the PID packets of the transport streams TS1, TS2, and TS3 thus reconstructed are absent. In the pseudo PID packet, random data in which a "0" value and a "1" value do not continue is inserted into payload portion. The insertion of the pseudo packets results in that in the transport streams TS1, TS2, and TS3 thus reconstructed, the PID packets become continuous. Thus, it becomes possible to stabilize the operation of the synchronous system of the receiving circuit of the transport streams TS1, TS2, and TS3 thus reconstructed.

A description will now be given with respect to an operation of the common interface controller 104 shown in FIG. 2. The transport streams TS1, TS2, and TS3 which have been supplied from the demodulators 103-1, 103-2, and 103-3 (refer to FIG. 1) are supplied to input buffers 141-1, 141-2, 141-3, respectively, to be temporarily stored therein. The relative times of the PID packets of the transport streams which are fetched in the input buffers 141-1, 141-2, 141-3, respectively, are managed by storing the count value of the clock signal generated in the input clock generator 151. FIG. 3A shows an example of a structure of the PID packets of the transport streams TS1, TS2, and TS3 which are fetched in the input buffers 141-1, 141-2, 141-3, respectively.

The LTSID/LTS adder 152 uses the dual port memories 142-1, 142-2, and 142-3, and adds the LTSIDs (stream identifiers) and the LTSs (time stamps). In this case, the LTSIDs and the LTSs are added to the PID packets (the PID packets which are not unnecessary) which are left after the PID data packets have been removed from the service channels for which the transport streams TS1, TS2, and TS3 are not selected (tuned).

The PID packets to which the LTSIDs and the LTSs of the transport streams TS1, TS2, and TS3 are added are held in the dual port memories 142-1, 142-2, and 142-3, respectively. FIG. 3B shows an example of the PID packets, which are not unnecessary, of the transport streams TS1, TS2, and TS3 for the input shown in FIG. 3A.

In the TS re-mapper/output rate controller 143, the PID packets to which the LTSIDs and the LTSs are added in the transport streams are compounded into one stream. In this case, the PID packets to which the LTSIDs and the LTSs are added in the transport streams from the dual port memories 142-1, 142-2, and 142-3 are successively read out in the ascending order of the time, thereby carrying out the compounding. FIG. 4A shows an example of the PID packets which are not unnecessary of the transport streams to which the LTSIDs and the LTSs held in the dual port memories 142-1, 142-2, and 142-3 are added. In addition, FIG. 4A shows an example of the stream into which the PID packets are compounded in the TS re-mapper/output rate controller 143.

The packets of one stream obtained through the compounding are successively transmitted from the TS re-mapper/output rate controller 143 to the CAM module 200 through the DVB-CI common interface. In this case, in the TS re-mapper/output rate controller 143, a clock rate necessary for the continuous transmission is determined from an entire amount of data, and the packets are continuously transmitted to the CAM module 200. FIG. 4B shows an example of the packets which are continuously transmitted to the CAM module 200 in such a manner.

In addition, both of the stream information and the service channel information are transmitted in correspondence to the operation for transmitting the PID packets from the TS re-mapper/output rate controller 143 to the CAM module 200 through the DVB-CI common interface. Here, the stream information represents which of the transport streams the PID packet belongs to, and the service channel information represents which of the service channels the PID packet belongs to.

In addition, in the TS re-construct buffer 144, the PID packets of the transport streams TS1, TS2, and TS3 are successively received as one stream from the CAM module 200 through the DVB-CI common interface. Also, the PID packets stored in the TS re-construct buffer 144 are sorted into the transport streams TS1, TS2, and TS3, respectively, in accordance with the LTSIDs (stream identifiers) added to the PID packets by the LTSID controller 153. Also, the PID packets thus sorted are rewritten to the dual port memories 142-1, 142-2, and 142-3, respectively.

Figure 5:
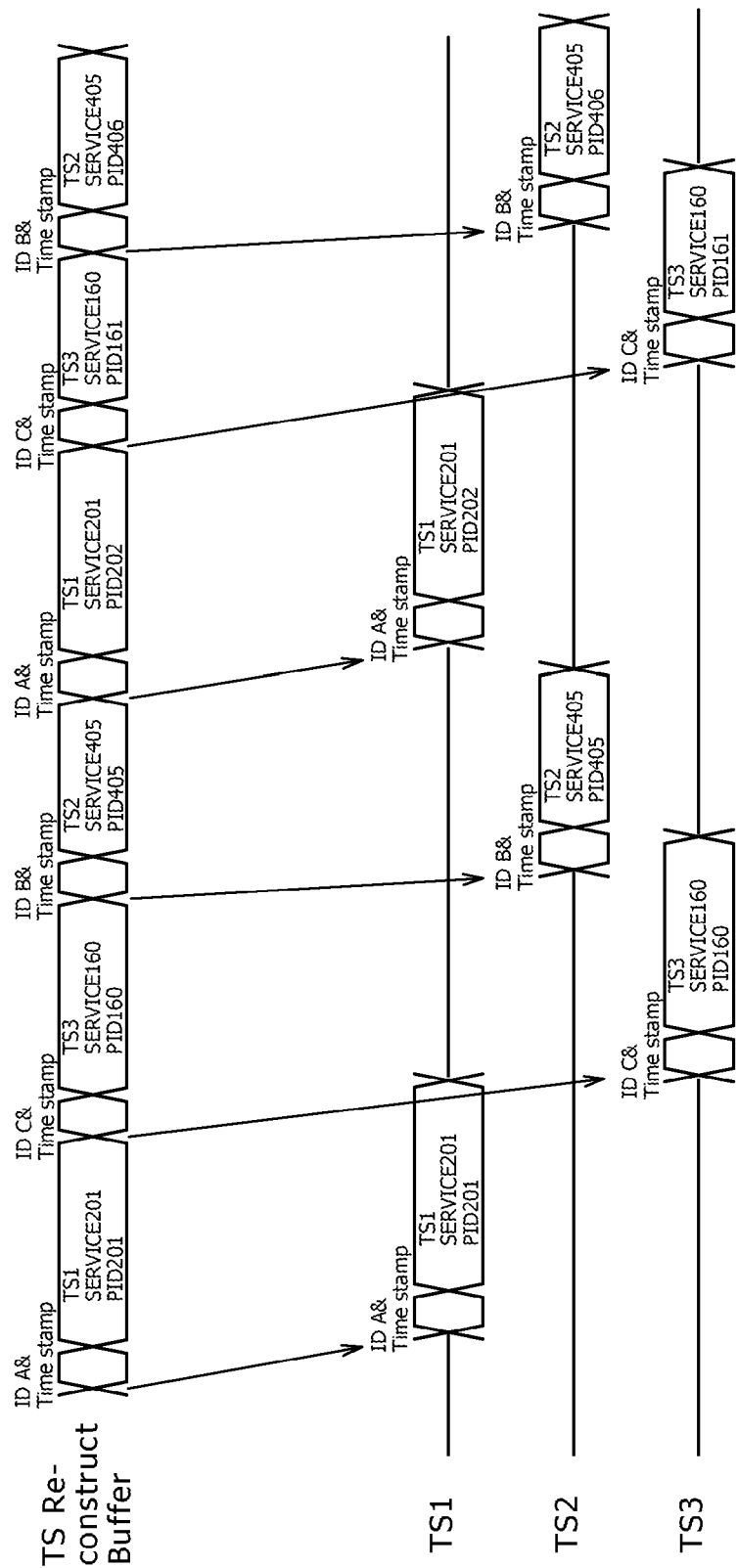
FIG. 5 is a diagram showing an example of a structure of PID packets contained in one stream which is received by a TS re-construct buffer.

FIG. 5 shows an example of the PID packets of the transport streams TS1, TS2, and TS3 contained in one stream which is received by the TS re-construct buffer 144. In addition, FIG. 5 shows a state in which the PID packets of the transport streams TS1, TS2, and TS3 contained in one stream are sorted into the transport streams TS1, TS2, and TS3, respectively.

The LTS reader 154 reads out the time stamps added to the PID packets which are written to the dual port memories 145-1, 145-2, and 145-3, respectively. The PID timing adjusters 146-1, 146-2, and 146-3 reconstruct the transport streams TS1, TS2, and TS3 based on the results of the reading-out. That is to say, the PID timing adjusters 146-1, 146-2, and 146-3 read out the PID packets written to the dual port memories 145-1, 145-2, and 145-3 in such a way that the PID packets are disposed in the time positions corresponding to the LTSs (time stamps) added to the PID packets. As a result, the transport streams TS1, TS2, and TS3 thus reconstructed are outputted from the PID timing adjusters 146-1, 146-2, and 146-3, respectively.

In this case, the PID timing adjusters 146-1, 146-2, and 146-3 insert pseudo PID packets of the PIDs different from the PID packets into the time positions, respectively, where the PID packets of the transport streams TS1, TS2, and TS3 thus reconstructed are absent. In the pseudo PID packet, random data in which a "0" value and a "1" value do not continue is inserted into payload portion. The transport streams TS1, TS2, and TS3 which are re-constructed in the PID timing adjusters 146-1, 146-2, and 146-3 in such a way are outputted from the common interface controller 104.

FIG. 6A shows an example of the transport streams TS1, TS2, and TS3 which are re-constructed in the PID timing adjusters 146-1, 146-2, and 146-3. Also, FIG. 6B shows an example of the transport streams TS1, TS2, and TS3 into which the pseudo PID packets are inserted, respectively, and which are finally outputted from the PID timing adjusters 146-1, 146-2, and 146-3, respectively.

A flow chart of FIG. 7 shows an example of a processing procedure when the common interface controller 104 compounds the PID packets of the transport streams TS1, TS2, and TS3 into one stream which is in turn transmitted to the CAM module 200.

In processing in step ST1, the common interface controller 104 starts an operation, and then the operation proceeds to processing in step ST2. In the processing in step ST2, the common interface controller 104 inputs the transport stream TS1, TS2, and TS3.

Next, in processing in step ST3, the common interface controller 104 excludes the PID data packets of the service channels which are not selected (tuned) of the transport streams. Also, in the processing in step ST3, the common interface controller 104 further adds the LTSIDs (stream identifiers), and the LTSs (time stamps) corresponding to the input times, respectively, to the heads of the remaining PID packets (the PID packets which are not unnecessary), respectively.

Next, in processing in step ST4, the common interface controller 104 arranges the remaining PID packets of the transport streams in the ascending order of the time to compound the remaining PID packets of the transport streams thus arranged. Also, in processing in ST5, the common interface controller 104 successively transmits the PID packets thus compounded to the CAM module 200 at the clock rate necessary for the continuous transmission. After completion of the processing in step ST5, the common interface controller 104 ends the operation.

Figure 8:
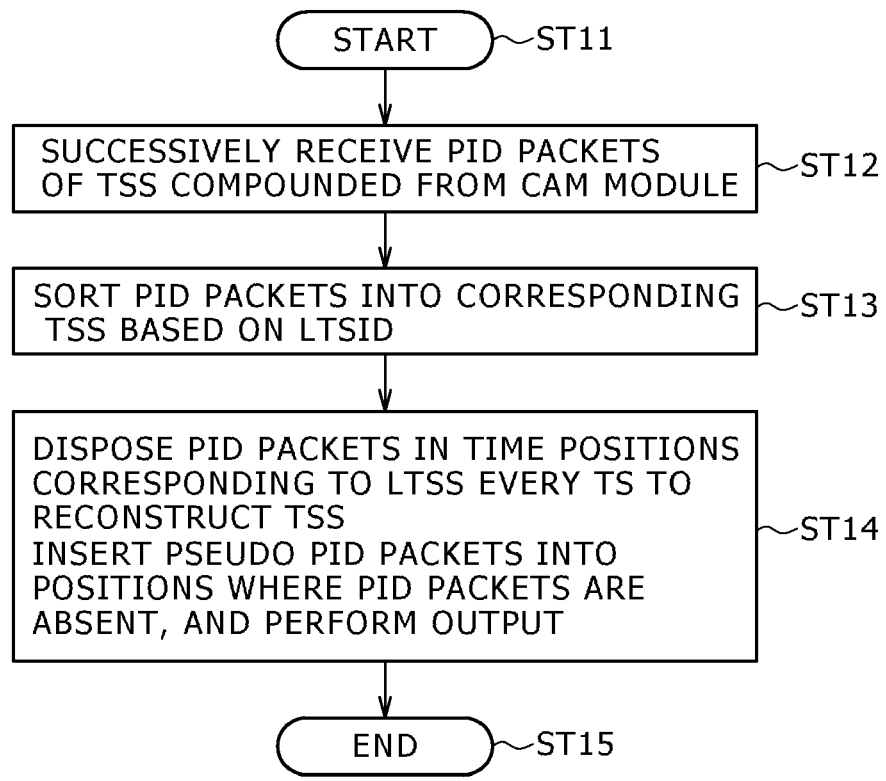
FIG. 8 is a flow chart showing a processing procedure in the common interface controller when the compounded PID packets of the transport streams are received from the CAM module.

A flow chart of FIG. 8 shows an example of a processing procedure when the common interface controller 104 receives the compounded PID packets of the transport streams TS1, TS2, and TS3 from the CAM module 200.

In processing in step ST11, the common interface controller 104 starts an operation, and then the operation proceeds to processing in step ST12. In the processing in step ST12, the common interface controller 104 successively receives the compounded PID packets of the transport streams TS1, TS2, and TS3 from the CAM module 200.

Next, in processing in step S13, the common interface controller 104 sorts the PID packets to any one of the transport streams TS1, TS2, and TS3 in accordance with the added LTSIDs (stream identifiers).

Next, in processing in step S14, the common interface controller 104 disposes the time positions of the PID packets sorted in the time positions corresponding to the LTSs (time stamps) added to the PID packets every transport stream. As a result, the common interface controller 104 reconstructs the transport streams TS1, TS2, and TS3. In addition, in the processing in step S14, the common interface controller 104 inserts the pseudo PID packets into the positions where the PID packets are absent in the transport streams, and outputs the pseudo PID packets thus inserted. After completion of the processing in step S14, in processing in step ST15, the operation ends.

It is noted that the common interface controller 104 executes the above transmitting processing shown in the flow chart of FIG. 7, and the above receiving processing shown in FIG. 8 in parallel with each other, and periodically repeats the above transmitting processing shown in the flow chart of FIG. 7, and the above receiving processing shown in FIG. 8.

[Addition of LTSIDs, LTSs to TSPs (PTD Packets)]

Figure 9:
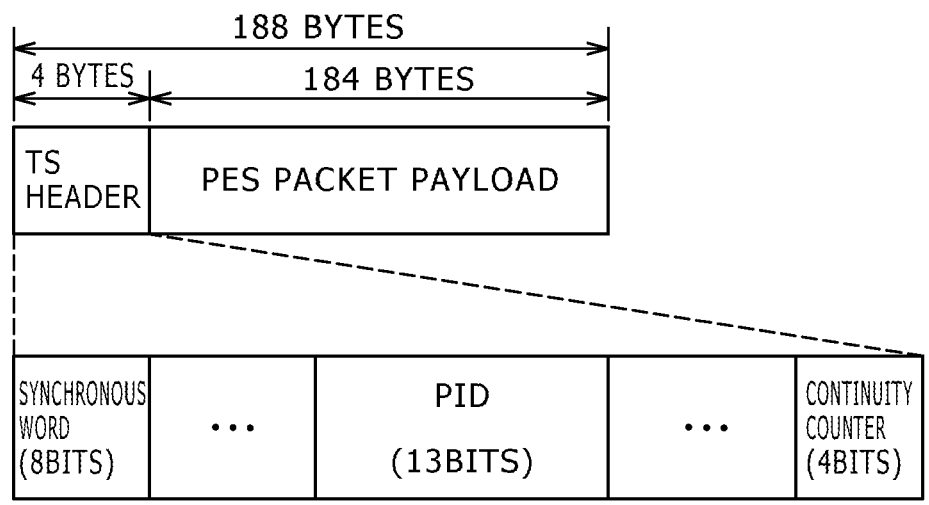
FIG. 9 is a diagram showing a structure of a transport stream packet (TSP)

Next, a further description will now be given with respect to the addition of the LTSIDs (stream identifies) and the LTSs (time stamps) to the TSPs (transport stream packets) with reference to FIG. 9. FIG. 9 shows a structure of the TSP. The TSP has a 188-byte fixed length. 4 bytes of a head of the TSP is a TS header, and 184 bytes following 4 bytes of the head of the TSP are set as a PES packet payload. Also, in the TS header, a synchronous word (0x47) of 8 bits exists in the head thereof, a PID of 13 bits exists, and a continuity counter (continuity_counter) area of 4 bits finally exists.

The LTSID (stream identifier), and the LTS (time stamp) are added at least forward, backward or midway with respect to the TSP. In this case, the LTSID (stream identifier), and the LTS (time stamp) are added as a pre-header before the TSP, and are also added as a footer after the TSP. In addition, for example, the continuity counter area within the TS header is utilized and added to the middle of the TSP.

Figure 10:
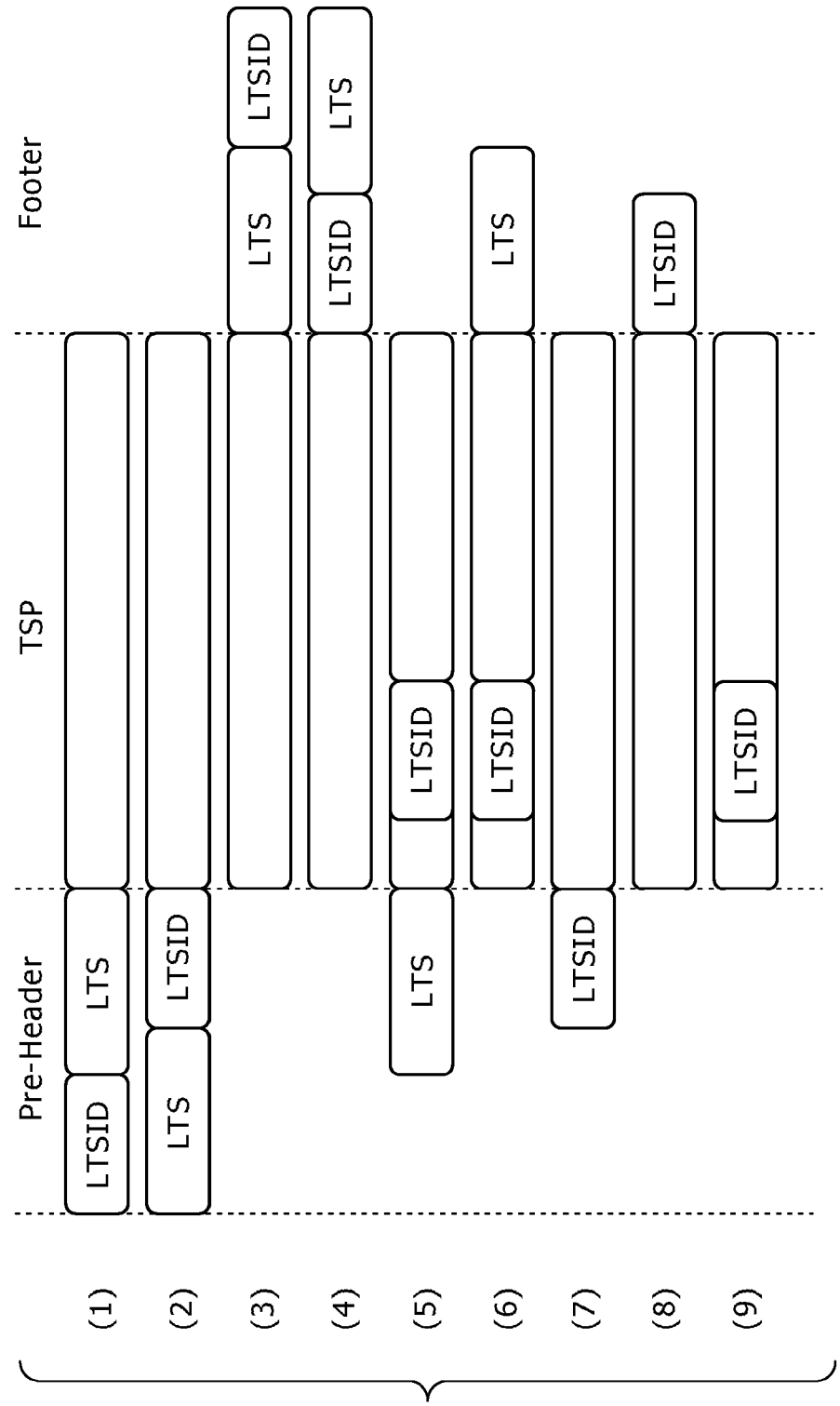
FIG. 10 is a diagram showing a pattern of positions of insertion of additional information such as an LTSID (stream identifier) and an LTS (time stamp)

FIG. 10 shows nine patters as an example of the insertion positions of the additional information such as the LTSID (stream identifier) and the LTS (time stamp). A pattern (1) is an example in which the LTSID and the LTS are added integrally with each other as the pre-header before the TSP. A pattern (2) is an example in which the order of the LTSID and the LTS is reversed from that in the case of the pattern (1). A pattern (3) is an example in which the LTSID and the LTS are added integrally with each other as the footer after the TSP. Also, a pattern (4) is an example in which the order of the LTSID and the LTS is reversed from that in the case of the pattern (3).

A pattern (5) is an example in which the LTS is added as the pre-header before the TSP, and the LTSID is added to the continuity counter area within the TS header in the middle of the TSP. A pattern (6) is an example in which the LTS is added as the footer after the TSP, and the LTSID is added to the continuity counter area within the TS header in the middle of the TSP.

A pattern (7) is an example in which the LTSID is added as the pre-header before the TSP. A pattern (8) is an example in which the LTSID is added as the footer after the TSP. Also, a pattern (9) is an example in which the LTSID is added to the continuity counter area within the TS header in the middle of the TSP. It is noted that although the LTS is not added to the TSP in each of the patterns (7) to (9), in these patterns (7) to (9), the LTS is transmitted by utilizing a method different from the method of adding the LTS to the TSP.

It is noted that each of the above cases of FIGS. 4A and 4B and FIG. 5 shows the pattern (the pattern (1) or (2) in which the LTSID (stream identifier) and the LTS (time stamp) are added integrally with each other to the pre-header before the TSP.

Next, a description will now be given with respect to lengths of the LTSID (stream identifier), and the LTS (time stamp). The LTSID is set as the predetermined number of bits, for example, 4 bits. In the case of 4 bits, the LTSID can be added to the TSP by utilizing the continuity counter area (4 bits) within the TS header of the TSP. In addition, in the case of 4 bits, it is possible to respond to the compounding (synthesis) of up to 16 transport streams.

The LTS is set as the predetermined number of bytes, for example, either 3 bytes or 4 bytes. Here, let us consider the number of necessary bits of the LTS. Firstly, a description will now be given with respect to the number of necessary bits of the LTS when the LTS is the absolute time. In this case, as shown in FIG. 11, all it takes is that a local time is not wrapped with the delay from an LTS addition timing to an LTS use timing, and a necessary time precision is obtained.

Figure 11:
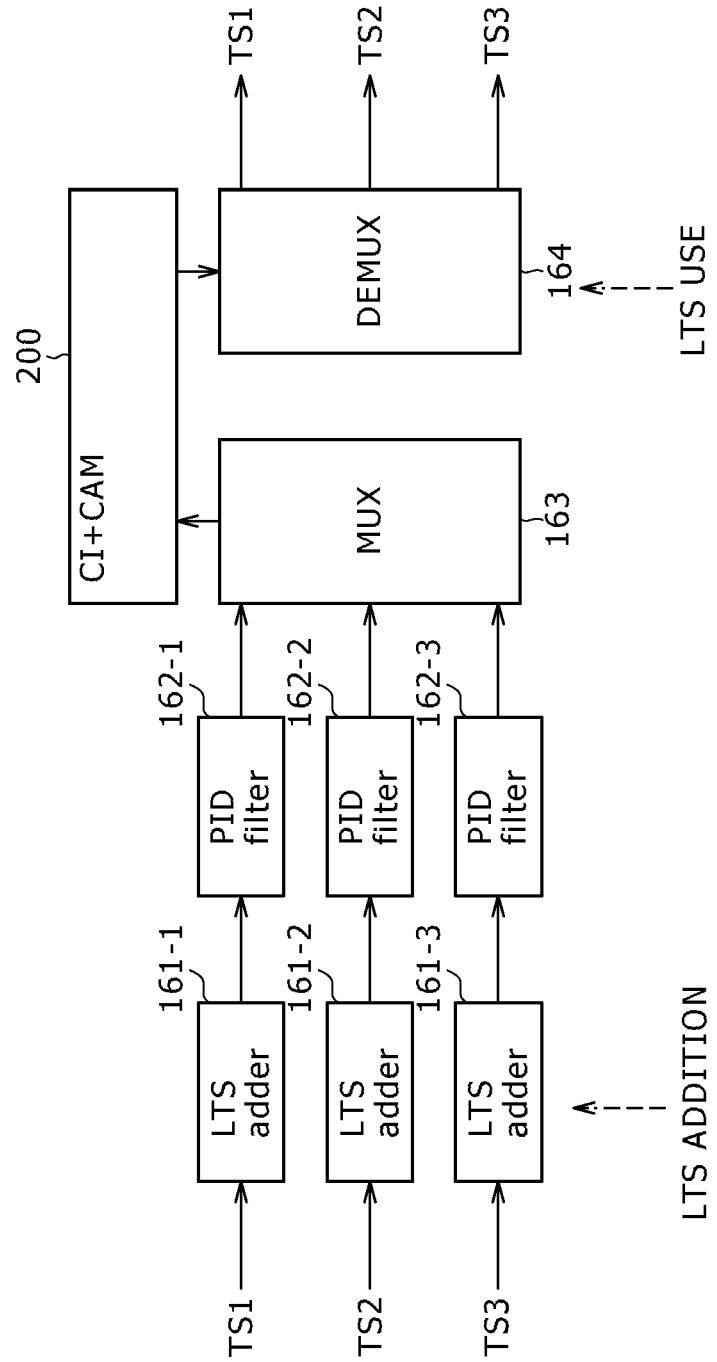
FIG. 11 is a block diagram explaining the number of necessary bits of an LTS when the ILS is an absolute time.

It is noted that in FIG. 11, LTS adders 161-1, 161-2, and 161-3 are portions for adding the LTSs to the PID packets of the transport streams TS1, TS2, and TS3, respectively. Also, the LTS adders 161-1, 161-2, and 161-3 are functional portions included in the above LTSID/LTS adder 152 shown in FIG. 2.

In addition, PID filters 162-1, 162-2, and 162-3 are portions for excluding the PID data packets of the service channels which are not selected (tuned) from the transport streams TS1, TS2, and TS3, respectively. Also, the PID filters 162-1, 162-2, and 162-3 are included in the above LTSID/LTS adder 152 shown in FIG. 2.

A multiplexer 163 is a portion for multiplexing and compounding the PID packets of the transport streams TS1, TS2, and TS3 into one stream. Also, the multiplexer 163 is included in the above TS re-mapper/output rate controller 143 shown in FIG. 2.

A demultiplexer 164 is a portion for demultiplexing the PID packets contained in one stream which has been returned back from the CAM module 200 to reconstruct the transport streams TS1, TS2, and TS3. This portion corresponds to the portion composed of the TS re-construct buffers 144, the dual port memories 145-1, 145-2, and 145-3, and the PID timing adjusters 146-1, 146-2, and 146-3 which are all shown in FIG. 2.

Here, when the system requirements are set in the following manner, the number of necessary bits of the LTS becomes 23 bits. That is to say, the resolution is set as 27 MHz identical to that of the PCR. In addition, a maximum delay amount from the LTS addition timing to the LTS use timing (demultiplexing timing) is set as 3 packets. The 3 packets are obtained in such a way that the maximum delay amount due to waiting time in a phase of the demultiplexing is set as 2 packets, and the maximum delay amount of the CAM module 200 is set as 1 packet.

Figure 12:
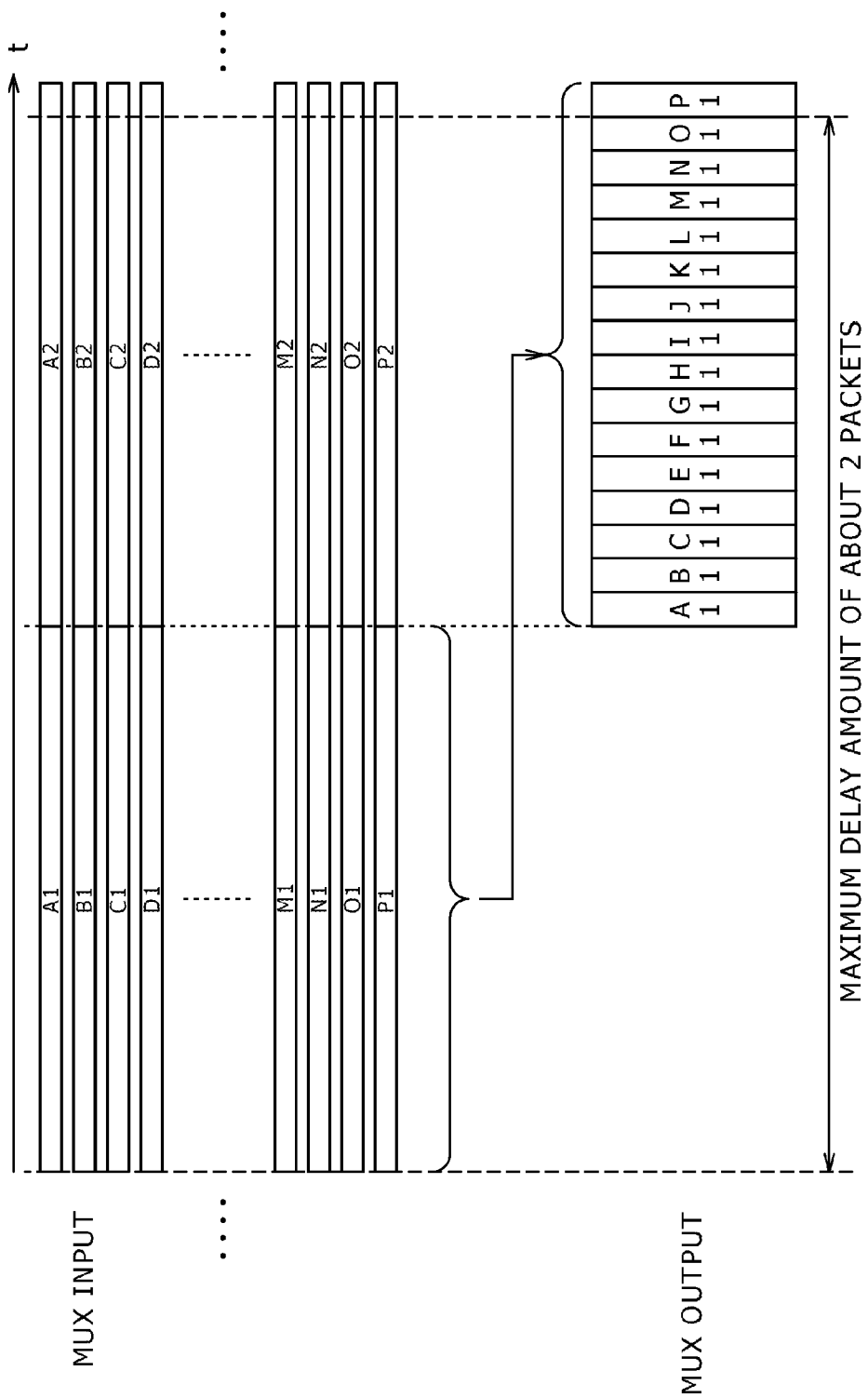
FIG. 12 is a diagram showing an example of an amount of delay when 16 transport streams A to P are multiplexed to be compounded.

FIG. 12 shows an example of a delay amount when 16 transport streams A to P are multiplexed to be compounded. In the figure, symbols in which suffixes such as "1," "2," . . . are added to A to P represent the PID packets of the transports A to P, respectively. In this example, the delay due to the waiting time for the PID packet of the transport stream P gives the maximum delay amount, and the maximum delay amount is about 2 packets.

Here, a lower limit value of a bit rate of the PID packet can be calculated as 15.04 kbps from the standard (IS013818-1 D.0.3) that the packet containing therein the PCR is contained at least once within 100 ms. Also, 3 packets of the maximum delay amount described above is obtained as 300 ms from the lower limit value of the bit rate. For this reason, when the resolution is set as 27 MHz, the number of necessary bits of the LTS becomes 23 bits.

FIG. 13 shows a relationship between the bit rate and the number of necessary bits when the maximum delay amount is 3 packets. As described above, when the bit rate is set as 15.04 kbps, the maximum delay amount is 300 ms, and the number of necessary bits is 23 bits. It is noted that portions in which the bit rates are 10 Mbps, 1 Mbps, and 100 kbps, respectively, are listed as comparative examples.

As described above, when the LTS (time stamp) is the absolute time, the resolution is 27 MHz, and the maximum delay amount from the LTS addition timing to the LTS use timing is 3 packets, the number of necessary bits of the LTS becomes 23 bits, and the LTS of 3 bytes is enough. In this case, however, an upper limit delay amount regulation for the CAM module becomes necessary.

Next, a description will now be given with respect to the number of necessary bits of the LTS when the LTS is the absolute time. In this case, firstly, a description will be given with respect to how to add the LTSs (relative times) to the PID packets, respectively, and the timing adjustment using the LTSs (relative times) in the phase of the reconstruction.

Figure 14:
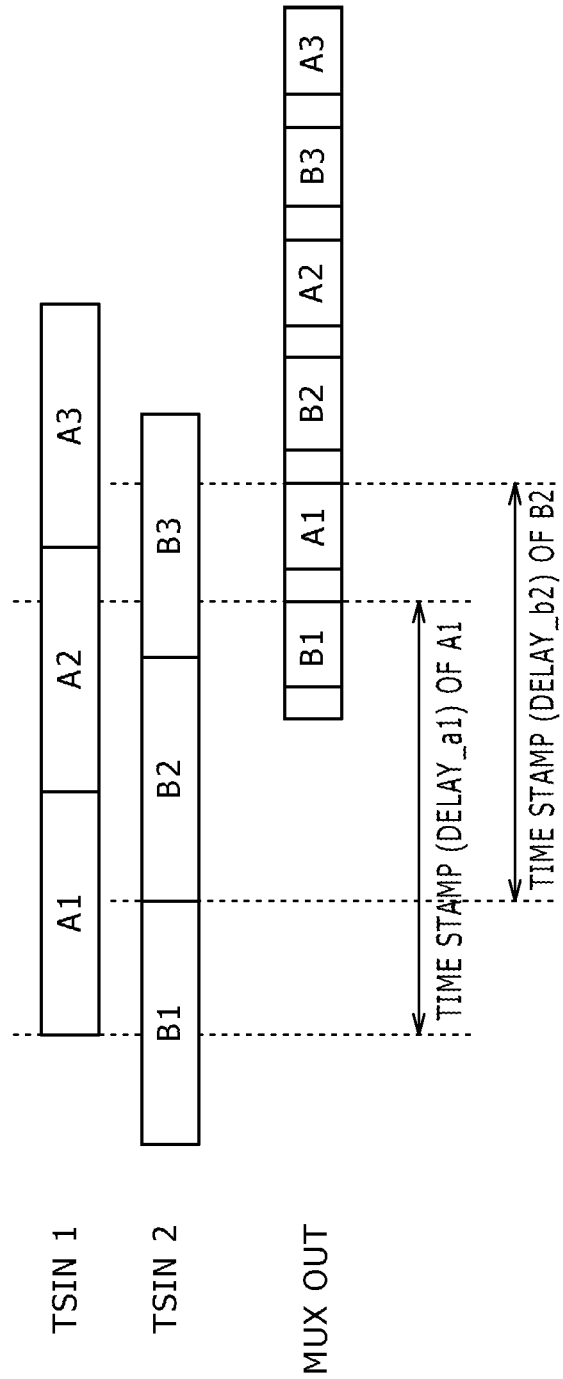
FIG. 14 is a diagram explaining how to put the LTS (relative time) to each of the PID packets.

FIG. 14 schematically shows how to add the LTSs (relative times) to the PID packets, respectively. The example shown in FIG. 14 shows an example of transport streams TSN 1 and TSN 2 for the sake of simplicity of the description. In the figure, "A1," "A2," . . . respectively show the PID packets composing the transport stream TSIN 1. Also, "B1," "B2," . . . respectively show the PID packets composing the transport stream TSIN 2.

For example, the LTS (relative time) added to the PID packet of "A1" is set as a delay time (delay_a1) from time at which the PID packet of "A1" is inputted to the input buffer to time at which the PID packet of "A1" is actually subjected to the synthesis in the multiplexer (MUX). In addition, for example, the LTS (relative time) added to the PID packet of "B2" is set as a delay time (delay_b2) from time at which the PID packet of "B2" is inputted to the input buffer to time at which the PID packet of "B2" is actually subjected to the synthesis in the multiplexer (MUX). Although a detailed description is omitted here, this also applies to any of other PID packets.

Figure 15:
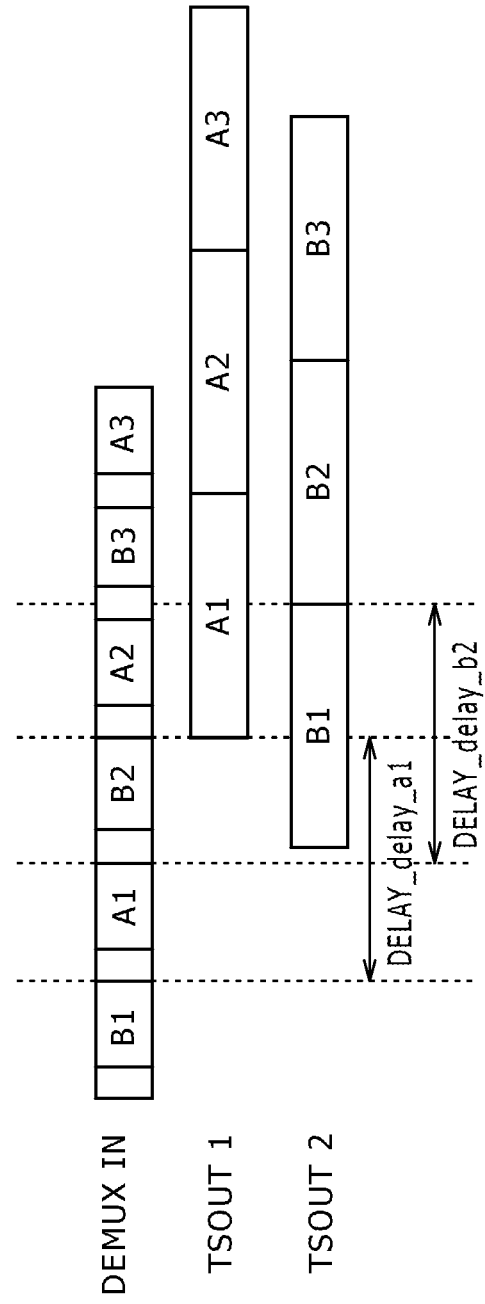
FIG. 15 is a diagram explaining a timing adjustment using the LTS (relative time) in the phase of the re-construction.

FIG. 15 schematically shows an example of the timing adjustment using the LTSs (relative times) in the phase of the re-construction. The example shown in FIG. 15 shows an example in which two transports streams TSOUT 1 and TSOUT 2 are reconstructed for the sake of simplicity of the description. Similarly to the above case of FIG. 14, "A1," "A2," . . . represent the PID packet composing the transport stream TSOUT 1 which is to be re-constructed. In addition, "B1," "B2," . . . represent the PID packet composing the transport stream TSOUT 2 which is to be re-constructed.

For example, the PID packet of "A1" which has been demultiplexed is delayed by only "DELAY-delay_a1" to be subjected to the timing adjustment. Here, "DELAY" is a fixed delay, and has at least a value which is equal to or larger than the maximum value of the LTS (relative time). In addition, for example, the PID packet of "B2" which has been demultiplexed is delayed by only "DELAY-delay_b2" to be subjected to the timing adjustment. Although a detailed description is omitted here, this also applies to any of other PID packets.

Figure 16:
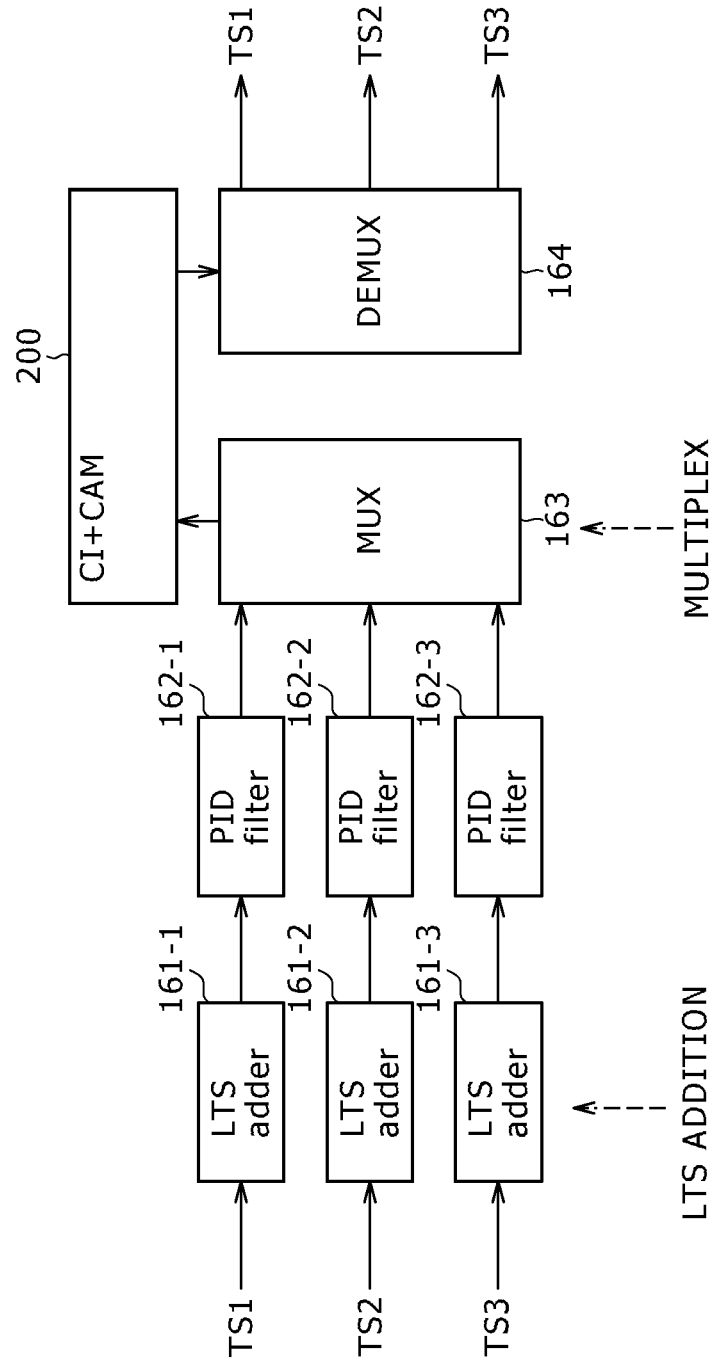
FIG. 16 is a diagram explaining the number of necessary bits of the LTS when the LTS is the relative time.

When the LTS is the relative time, as shown in FIG. 16, all it takes is that the local time is not wrapped with the delay from the LTS addition timing to the multiplexing timing, and the necessary time precision is obtained. It is used that although a detailed description is omitted here, in FIG. 16, the portions corresponding to those in FIG. 11 are designated by the same reference numerals or symbols, respectively.

Here, when the system requirements are set in the following manner, the number of necessary bits of the LTS becomes 23 bits. That is to say, the resolution is set as 27 MHz similarly to the case of the PCR. In addition, a maximum delay amount from the LTS addition timing to the multiplexing timing is set as 2 packets (refer to FIG. 12).

Here, a lower limit value of a bit rate of the PID packet can be calculated as 15.04 kbp from the standard (ISO13818-1 D.0.3) that the packet containing therein the PCR is contained at least once within 100 ms. Also, 2 packets of the maximum delay amount described above is obtained as 200 ms from the lower limit value of the bit rate. For this reason, when the resolution is set as 27 MHz, the number of necessary bits of the LTS becomes 23 bits.

FIG. 17 shows a relationship between the bit rate and the number of necessary bits when the maximum delay amount is 2 packets. As described above, when the bit rate is 15.04 kbps, the maximum delay amount is 200 ms, and the number of necessary bits is 23 bits. It is noted that portions in which the bit rates are 10 Mbps, 1 Mbps, and 100 kbps, respectively, are listed as comparative examples.

As described above, when the LTS (time stamp) is the absolute time, the resolution is 27 MHz, and the maximum delay amount from the LTS addition timing to the multiplexing timing is 2 packets, the number of necessary bits of the LTS becomes 23 bits, and the LTS of 3 bytes is enough. In this case, however, unlike the case where the LTS (time stamp) described above is set as the absolute time, the upper limit delay amount regulation for the CAM module 200 becomes unnecessary.

FIG. 18 shows an example of the LTSID (stream identifier), the insertion portion of the LTS (time stamp), and the number of bytes. A "Plan 1" is such that the LTS of 3 bytes is added either to the pre-header or to the footer, and the LTSID of 0.5 bytes (4 bits) is inserted into the area of the continuity counter within the TS header. A corresponding bit rate in this case becomes 94.49 Mbps. In this case, the corresponding bit rate can be increased all the more because the CRC is not added and the LTSID is also disposed within the TS header.

In addition, a "Plan 2" is such that the LTS of 4 bytes is added either to the pre-header or to the footer, and the LTSID of 0.5 bytes (4 bits) is inserted into the area of the continuity counter within the TS header. A corresponding bit rate in this case becomes 94.00 Mbps. In addition, a "Plan 3" is such that each of the LTSID of 0.5 bytes (4 bits) and the LTS of 3.5 bytes is added either to the pre-header or to the footer. A corresponding bit rate in this case becomes 94.00 Mbps.

It is noted that in each of the "Plan 1" and the "Plan 2," the LTSID of 0.5 bytes (4 bits) is inserted into the area of the continuity counter within the TS header. For this reason, even when the CAM module 200 complying with the version 1.3.1 is connected, it becomes possible to carry out the synthesis and separation of the plural transport streams.

FIG. 20A shows an example of a configuration of a portion for carrying out the synthesis and separation of the plural transport streams. Although a detailed description is omitted here, in FIG. 20A, portions corresponding to those in FIG. 11 are designated by the same reference symbols, respectively. FIG. 20B shows an example of the PID packet (to which the LTS and the LTSID are both added) which is transmitted from the multiplexer 163 to the CAM module 200.

In this case, a TS synch (TSSync) signal, a TS valid signal, and a TS clock signal are also supplied from the multiplexer 163 to the CAM module 200. Of the TS synch signal, the TS valid signal, and the TS clock signal, the TS valid signal represents a valid signal period of time. When as shown in the figure, the TS valid represents a period of time of the TSP as the valid signal period of time so as to correspond to the period of time of the TSP, the CAM module 200 complying with the version 1.3.1 recognizes only the period of time of the TSP as the valid signal period of time and under this condition, executes predetermined pieces of processing.

FIG. 20C shows an example of the PID packet (to which the LTS and the LTSID are both added) which the demultiplexer 164 receives from the CAM module 200. In the case of the CAM module 200 complying with the version 1.3.1, the LTSs added to the outside of the TSPs are returned back after having been removed away. However, the LTSIDs remain in the areas of the continuity counters within the TS headers. For this reason, the separation of the plural transport streams can be carried out.

It is noted that FIG. 21A also shows an example of a configuration of a portion for carrying out the synthesis and separation of the plural transport streams. In the case of this example of the configuration, the CAM module 200 complies with a new version which can be compatible with both of the LTS and the LTSID which are added either forward or backward with respect to the TSP.

FIG. 21B shows an example of the PID packet (to which the LTS and the LTSID are both added) which is transmitted from the multiplexer 163 to the CAM module 200. In this case, the TS synch (TSSync) signal, the TS valid signal, and the TS clock signal are also supplied from the multiplexer 163 to the CAM module 200. Of the TS synch signal, the TS valid signal, and the TS clock signal, the TS valid signal represents a valid signal period of time.

Even when as shown in the figure, the valid signal represents the period of time of the TSP as the valid signal so as to correspond to the period of time of the TSP, the CAM module 200 complying with the new version recognizes each of the period of time of the TSP, and the periods of time of the added LTS and the like as the valid signal period of time, and under this condition, executes predetermined pieces of processing. For this reason, as shown in FIG. 21C, the PID packet (to which the LTS and the LTSID are both added) which the demultiplexer 164 receives from the CAM module 200, and the LTS and the like which are added either forward or backward with respect to the PID packet are returned back without being removed away.

FIG. 19 shows plans from a "Plan 4" to a "Plan 15" as another example of the LTSID (stream identifier), the insertion portion of the LTS (time stamp), and the number of bytes. In another example as well, in the case where the LTSID of 0.5 bytes (4 bits) is inserted into the area of the continuity counter within the LTSID, even when the CAM module 200 complying with a version 1.3.1 is connected, it becomes possible to carry out the synthesis and separation of the plural transport streams.

As described above, in the case where the LTSID is inserted into the area of the continuity counter within the TS header, it is expected to carry out a construction such that the values in the continuity counters of the headers of the transport streams composing the plural transport streams reconstructed are returned back to the original values, respectively.

Figure 22:
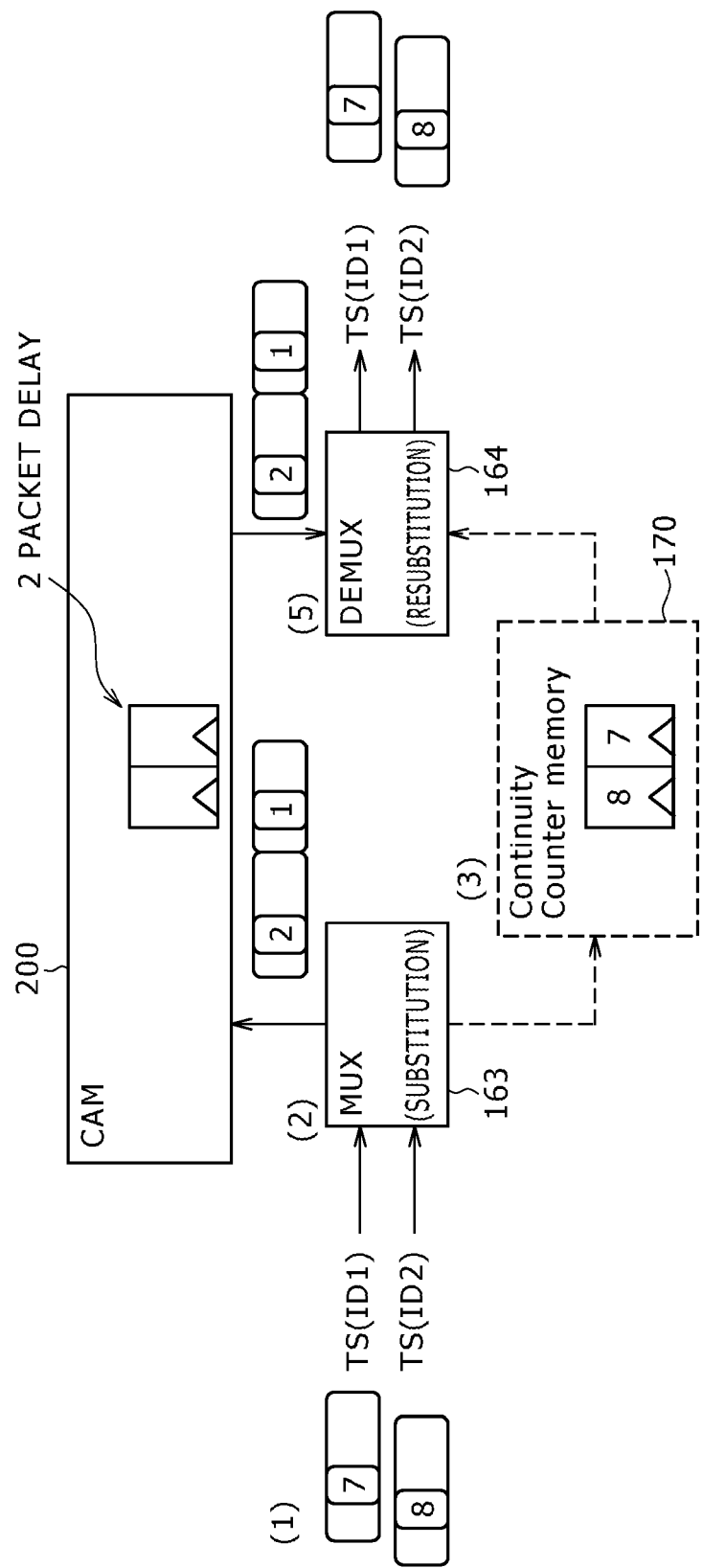
FIG. 22 is a block diagram explaining an example of a substituting method for values in the continuity counter.

This substitution, for example, can be carried out by using a continuity counter memory 170 as indicated by a broken line in FIGS. 20A, 20B, and 20C and FIGS. 21A, 21B, and 21C. FIG. 22 shows an example of a method of substitution of the value in the continuity counter. Note that, it is assumed that the delay amount of the CAM module 200 is fixed. Thus, in this example, the delay amount of the CAM module 200 is set as 2 packets. In addition, for the sake of simplicity of the description, this example deals with two transport streams.

(1) The PID packets of two transport streams TS arrive. In this case, it is supposed that the IDs of the respective streams are an ID1 and an ID2, and the values in the continuity counter areas are "7," and "8," respectively. (2) In the phase of the multiplexing, the LTSIDs (stream identifiers) are substituted for the values in the continuity counter areas, respectively. (3) At this time, the values in the continuity counter areas of the PID packets before the substitution are held in the continuity counter memory 170.

(4) When the PID packets of the transport streams are returned back from the CAM module 200, the values are fetched out from the continuity counter memory 170 in accordance with two packet delay in the CAM module 200. (5) Also, the values fetched from the continuity counter memory 170 are substituted for the vales in the continuity counter areas of the transport streams reconstructed by the demultiplexer 164 again.

The construction is carried out in such a way that the values in the continuity counters of the transport streams reconstructed are returned back to the original values in such a manner, respectively, it is possible to avoid that the influence due to that the values in the continuity counter areas are changed is exerted on the subsequent stage.

As described above, when one stream into which plural transport streams are compounded (synthesized) is transmitted from the host device 104 to the CAM module 200, the following signals are also transmitted synchronously with the PID packets within the one stream concerned. That is to say, the TS synchronous (TSSync) signal, the TS valid signal, and the TS clock signals are also transmitted.

Of the TS synch signal, the TS valid signal, and the TS clock signal, the TS valid signal represents a valid signal period of time. TS valid signal, for example, is set so as to represent only the period of time for the PID packet (TSP) as the valid signal period of time. In this case, even when the LTSID, the LTS, and the like are added either forward or backward with respect to the TSP, it is possible to avoid that the bad influence is exerted on the CAM module 200, complying with the existing version, for processing only the PID packet (TSP) as the valid signal period of time, for example, the CAM module 200 complying with the version 1.3.1.

In addition, for example, when a part of or all of the additional information described above is added either forward or backward with respect to the transport stream packet, the TS valid signal represents each of the period of time of the PID packet (TSP), and the periods of time of the LTSID and the LTS which are added either forward or backward with respect to the PID packet (TSP) as the valid signal period of time. In this case, when the LTSID, the LTS, and the like are added either forward or backward with respect to the PID packet (TSP), the CAM module 200 becomes easy to recognize not only the period of time of the PID packet (TSP), but also the additional period of time of the LTSID, the LTS, and the like thereof as the valid signal period of time.

Figures 23A, 23B:
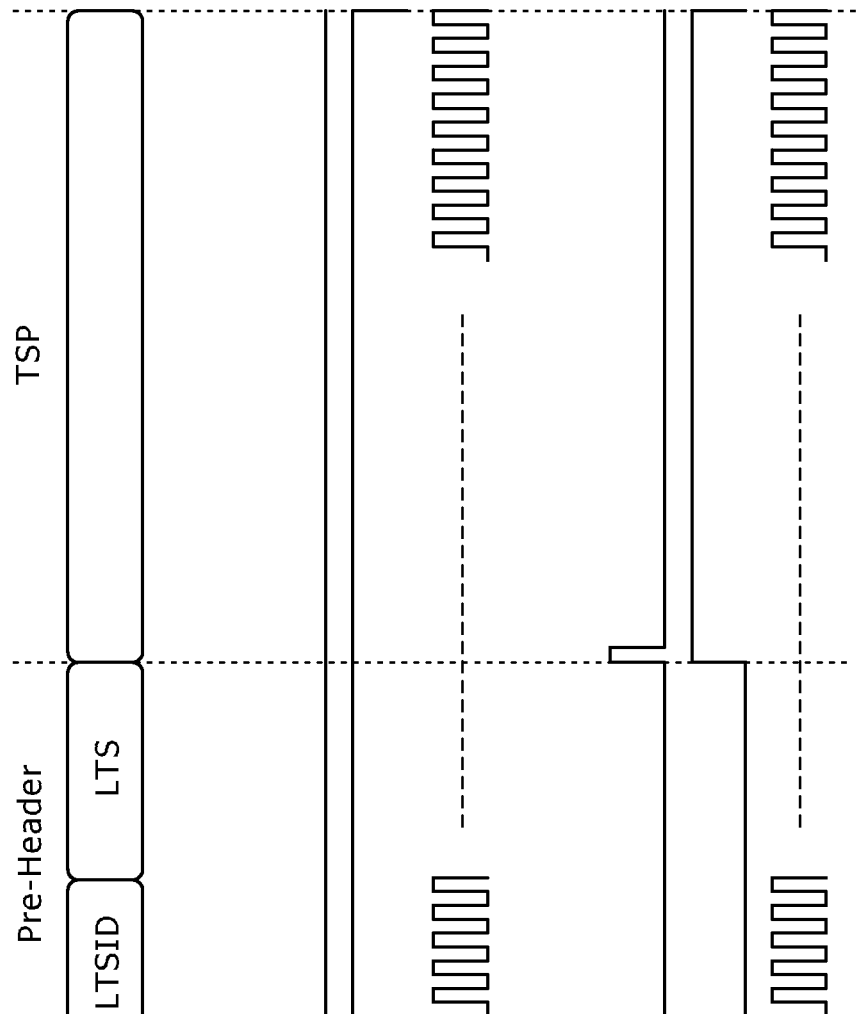
FIGS. 23A and 23B are respectively time charts showing an example of generation (corresponding to a pattern (1)) of a TS Sync signal, a TS Valid signal, and a TS Clock signal.

FIGS. 23A and 23B show examples, of generation of the TS sync (TSSync) signal, the TS valid signal, and the TS clock signal, which correspond to the example of the pattern (1) (refer to FIG. 10). FIG. 23B shows the example in which the TS valid signal is generated so as to represent only the period of time of the PID packet (TSP) as the valid signal period of time. FIG. 23A shows the example in which the TS valid signal is generated so as to represent not only the period of time of the PID packet (TSP), but also the additional periods of time of the TSID, the LTS, and the like as the valid signal periods of time.

Figures 24A, 24B:
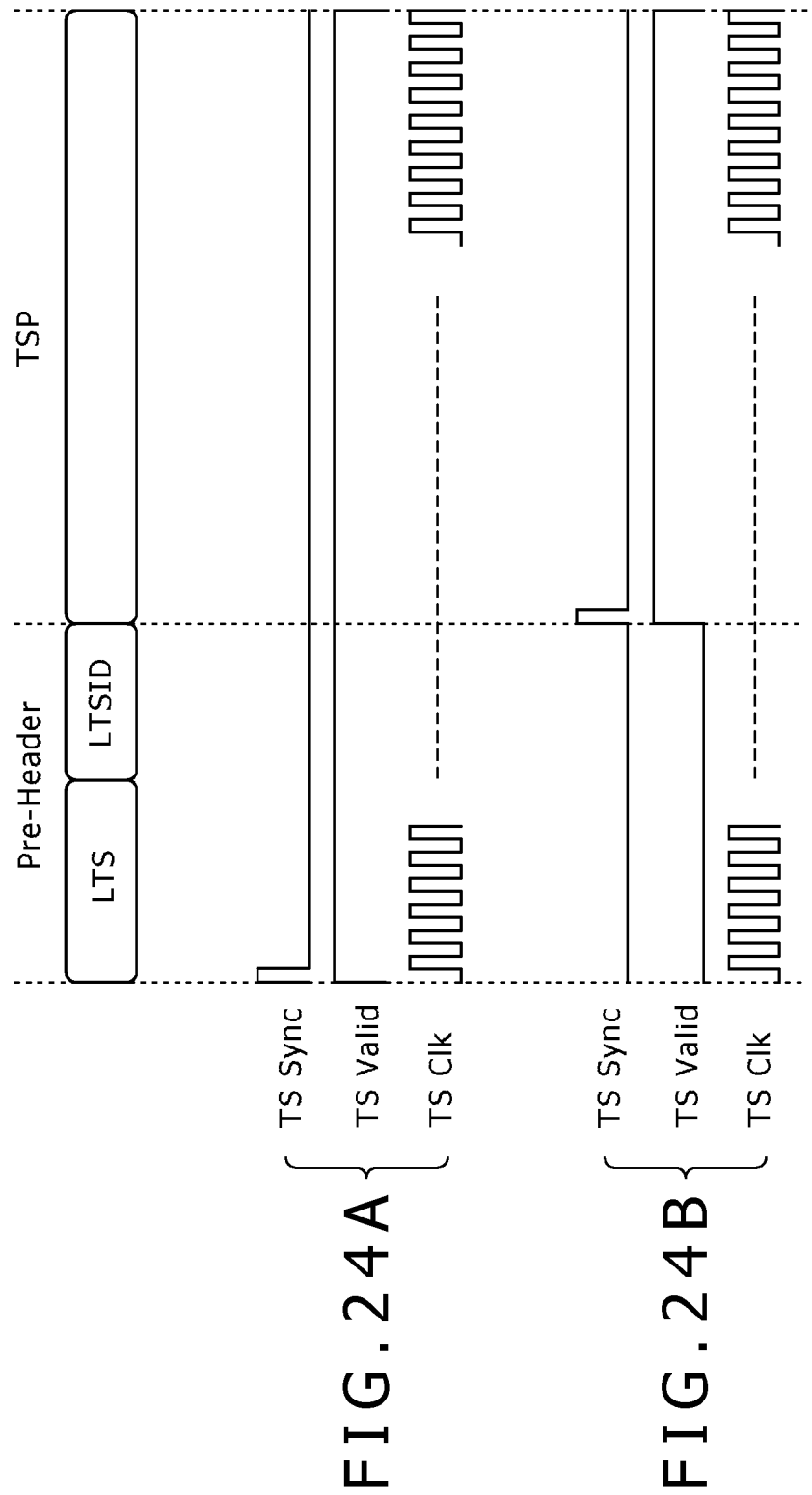
FIGS. 24A and 24B are respectively time charts showing an example of generation (corresponding to a pattern (2)) of the TS Sync signal, the TS Valid signal, and the TS Clock signal.

FIGS. 24A and 24B show examples, of generation of the TS sync (TSSync) signal, the TS valid signal, and the TS clock signal, which correspond to the example of the pattern (2) (refer to FIG. 10). FIG. 24B shows the example in which the TS valid signal is generated so as to represent only the period of time of the PID packet (TSP) as the valid signal period of time. FIG. 24A shows the example in which the TS valid signal is generated so as to represent not only the period of time of the PID packet (TSP), but also the additional periods of time of the TSID, the LTS, and the like as the valid signal period of time.

Figures 25A, 25B:
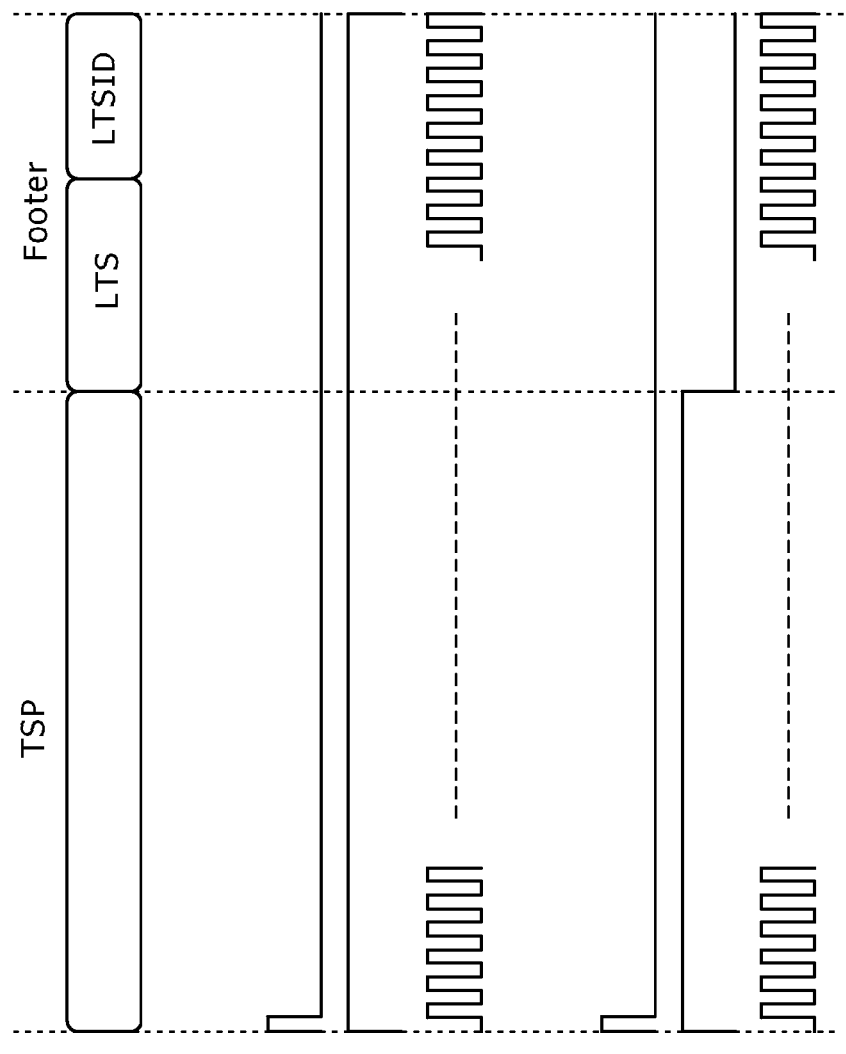
FIGS. 25A and 25B are respectively time charts showing an example of generation (corresponding to a pattern (3)) of the TS Sync signal, the TS Valid signal, and the TS Clock signal.

FIGS. 25A and 25B show examples, of generation of the TS sync (TSSync) signal, the TS valid signal, and the TS clock signal, which correspond to the example of the pattern (3) (refer to FIG. 10). FIG. 25B shows the example in which the TS valid signal is generated so as to represent only the period of time of the PID packet (TSP) as the valid signal period of time. FIG. 25A shows the example in which the TS valid signal is generated so as to represent not only the period of time of the PID packet (TSP), but also the additional periods of time of the TSID, the LTS, and the like as the valid signal periods of time.

FIGS. 26A and 26B show examples, of generation of the TS sync (TSSync) signal, the TS valid signal, and the TS clock signal, which correspond to the example of the pattern (4) (refer to FIG. 10). FIG. 26B shows the example in which the TS valid signal is generated so as to represent only the period of time of the PID packet (TSP) as the valid signal period of time. FIG. 26A shows the example in which the TS valid signal is generated so as to represent not only the period of time of the PID packet (TSP), but also the additional periods of time of the TSID, the LTS, and the like as the valid signal periods of time.

FIGS. 27A and 27B show examples, of generation of the TS sync (TSSync) signal, the TS valid signal, and the TS clock signal, which correspond to the example of the pattern (5) (refer to FIG. 10). FIG. 27B shows the example in which the TS valid signal is generated so as to represent only the period of time of the PID packet (TSP) as the valid signal period of time. FIG. 27A shows the example in which the TS valid signal is generated so as to represent not only the period of time of the PID packet (TSP), but also the additional periods of time of the TSID, the LTS, and the like as the valid signal periods of time.

FIGS. 28A and 28B show examples, of generation of the TS sync (TSSync) signal, the TS valid signal, and the TS clock signal, which correspond to the example of the pattern (6) (refer to FIG. 10). FIG. 28B shows the example in which the TS valid signal is generated so as to represent only the period of time of the PID packet (TSP) as the valid signal period of time. FIG. 28A shows the example in which the TS valid signal is generated so as to represent not only the period of time of the PID packet (TSP), but also the additional periods of time of the TSID, the LTS, and the like as the valid signal periods of time.

FIGS. 29A and 29B show examples, of generation of the TS sync (TSSync) signal, the TS valid signal, and the TS clock signal, which correspond to the example of the pattern (7) (refer to FIG. 10). FIG. 29B shows the example in which the TS valid signal is generated so as to represent only the period of time of the PID packet (TSP) as the valid signal period of time. FIG. 29A shows the example in which the TS valid signal is generated so as to represent not only the period of time of the PID packet (TSP), but also the additional periods of time of the TSID, the LTS, and the like as the valid signal periods of time.

FIGS. 30A and 30B show examples, of generation of the TS sync (TSSync) signal, the TS valid signal, and the TS clock signal, which correspond to the example of the pattern (8) (refer to FIG. 10). FIG. 30B shows the example in which the TS valid signal is generated so as to represent only the period of time of the PID packet (TSP) as the valid signal period of time. FIG. 30A shows the example in which the TS valid signal is generated so as to represent not only the period of time of the PID packet (TSP), but also the additional periods of time of the TSID, the LTS, and the like as the valid signal periods of time.

Figure 31:
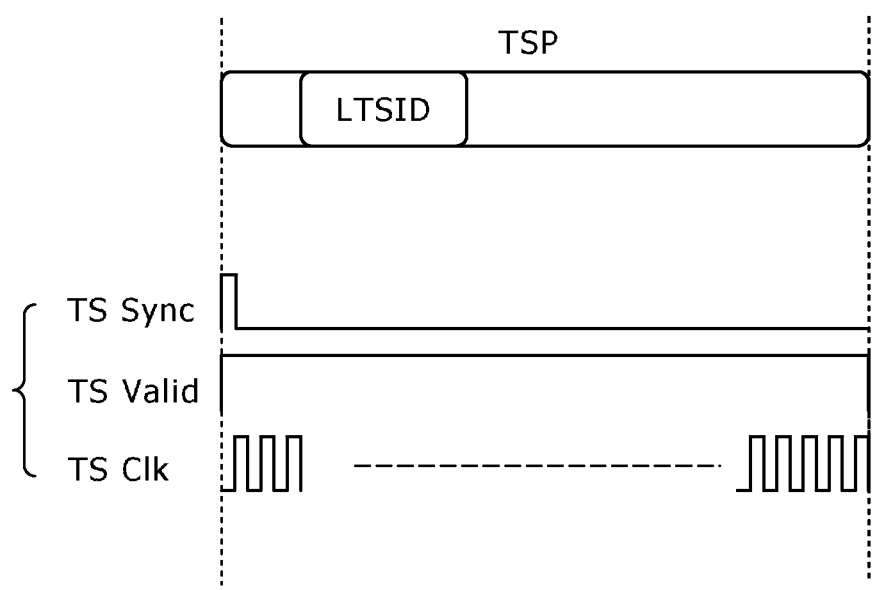
FIG. 31 is a time chart showing an example of generation (corresponding to a pattern (9)) of the TS Sync signal, the TS Valid signal, and the TS Clock signal.

FIG. 31 shows an example, of generation of the TS sync (TSSync) signal, the TS valid signal, and the TS clock signal, which corresponds to the pattern (9) described above (refer to FIG. 10).

As described above, in the receiving system 10 shown in FIG. 1, when one stream into which the plural transport streams are compounded (synchronized) is transmitted from the host device 100 to the CAM module 200, the LTSIDs (stream identifiers), and the LTSs (time stamps) are added to the PID packets (TSPs), respectively. For this reason, when the one stream concerned is returned back from the CAM module 200, the plural transport streams can be exactly and readily reconstructed based on the LTSIDs and the LTSs which are added to the PID packets (TSPs), respectively.

2. First Embodiment

Transmitting Apparatus

A transmitting apparatus according to a first embodiment of the present disclosure includes a stream inputting portion, an information adding portion, a stream synthesizing portion, and a stream transmitting portion.

In this case, the stream inputting portion inputs plural transport streams. The information adding portion adds additional information containing therein a stream identifier used to identify at least corresponding transport stream to respective transport stream packets of the plural transport streams thus inputted. The stream synthesizing portion synthesizes the plural transport streams in which the additional information is added to each of the transport stream packets, thereby obtaining one stream. Also, the stream transmitting portion transmits the resulting one stream to an external apparatus. In addition, in this case, the information adding portion adds the additional information forward, backward or midway with respect to each of the transport stream packets.

3. Second Embodiment

Program

In accordance with a program according to a second embodiment of the present disclosure, a computer is caused to function as a stream inputting section, an information adding section, a stream synthesizing section, and a stream transmitting section.

In this case, the stream inputting section inputs the plural transport streams. The information adding section adds the additional information containing therein the stream identifier used to identify at least corresponding transport stream to the respective transport stream packets of the plural transport streams thus inputted. The stream synthesizing section synthesizes the plural transport streams in which the additional information is added to each of the transport stream packets, thereby obtaining one stream. Also, the stream transmitting section transmits the resulting one stream to the external apparatus. In addition, in this case, the information adding section adds the additional information forward, backward or midway with respect to each of the transport stream packets.

4. Third Embodiment

Receiving Apparatus

A receiving apparatus according to a third embodiment of the present disclosure includes a stream receiving portion, and a stream reconstructing portion.

In this case, the stream receiving portion successively receives the transport stream packets to each of which additional information containing therein the stream identifier used to identify at least corresponding transport stream is added from the external apparatus. Also, the stream reconstructing portion reconstructs the plural transport streams based on the additional information from the transport stream packets. In addition, in this case, the additional information is added forward, backward or midway with respect to each of the transport stream packets.

5. Fourth Embodiment

Program

In accordance with a program according to a fourth embodiment of the present disclosure, a computer is caused to function as a stream receiving section, and a reconstructing section.

In this case, the stream receiving section successively receives the transport stream packets to each of which additional information containing therein the stream identifier used to identify at least corresponding transport stream is added from the external apparatus. Also, the reconstructing section reconstructs the plural transport streams based on the additional information from the transport stream packets. In addition, in this case, the additional information is added forward, backward or midway with respect to each of the transport stream packets.

6. Fifth Embodiment

Electronic Apparatus

An electronic apparatus according to a fifth embodiment of the present disclosure includes a transmitting apparatus of the first embodiment, and the receiving apparatus of the third embodiment.

The transmitting apparatus includes the stream inputting portion, the information adding portion, the stream synthesizing portion, and the stream transmitting portion.

In this case, the stream inputting portion inputs the plural transport streams. The information adding portion adds additional information containing therein a stream identifier used to identify at least corresponding transport stream to respective transport stream packets of the plural transport streams thus inputted. The stream synthesizing portion synthesizes the plural transport streams in which the additional information is added to each of the transport stream packets, thereby obtaining one stream. Also, the stream transmitting portion transmits the resulting one stream to the external apparatus. In addition, in this case, the information adding portion adds the additional information forward, backward or midway with respect to each of the transport stream packets.

The receiving apparatus includes the stream receiving portion, and the stream reconstructing portion.

In this case, the stream receiving portion successively receives transport stream packets to each of which additional information is added from the external apparatus. Also, the stream reconstructing portion reconstructs the plural transport streams based on the additional information from the transport stream packets.

7. Modified Changes

It is noted that in the receiving system described above of the present disclosure, the host device 100 includes the three tuners 102-1, 102-2, and 102-3, and deals with the three transport streams TS1, TS2, and TS3. The present disclosure can also be applied to the case where two, or four more transport streams are dealt with.

In addition, in the receiving system described above of the present disclosure, there is shown the example in which the stream obtained through the compounding (synthesis) is transmitted from the host device 100 to the CAM modules 200 connected to the host device 100 through the DVB-CI common interface. However, of course, the present disclosure can also be applied to the case where such a stream is transmitted to other external apparatus either in a wired style or in a wireless style.

In addition, in the receiving system described above of the present disclosure, there is shown the example in which the host device 100 and the CAM module 200 are connected to each other through the DVB-CI common interface. However, of course, the present disclosure can also be applied to the case where the host device 100 and the CAM module 200 are connected to each other through the CI+common interface.

In addition, the present disclosure can also adopt the following constitutions.

(1) A transmitting apparatus including:
a stream inputting portion inputting plural transport streams;
an information adding portion adding additional information containing therein a stream identifier used to identify at least corresponding transport stream to respective transport stream packets of the plural transport streams thus inputted;
a stream synthesizing portion synthesizing the plural transport streams in which the additional information is added to each of the transport stream packets, thereby obtaining one stream; and
a stream transmitting portion transmitting the resulting one stream to an external apparatus,
in which the information adding portion adds the additional information forward, backward or midway with respect to each of the transport stream packets.

(2) The transmitting apparatus described in the paragraph (1), in which the information adding portion inserts the stream identifier contained in the additional information into a continuity counter area within a header of the transport stream packet.

(3) The transmitting apparatus described in the paragraph (1) or (2), in which the additional information contains a time stamp corresponding to time of input as well as the stream identifier.

(4) The transmitting apparatus described in the paragraph (3), in which the information adding portion inserts the stream identifier into a continuity counter area within a header of the transport stream packet, and adds the time stamp either forward or backward with respect to the transport stream.

(5) The transmitting apparatus described in the paragraph (3), in which the information adding portion adds the stream identifier and the time stamp as a unit either forward or backward with respect to the transport stream packet.

(6) The transmitting apparatus described in any one of the paragraphs (1) to (5), in which when one stream is transmitted to the external apparatus, the stream transmitting portion transmits a valid signal representing a valid signal period of time to the external apparatus in correspondence to each of transport stream packets; and
the valid signal represents only a period of time of the transport stream packet as the valid signal period of time.

(7) The transmitting apparatus described in any one of the paragraphs (1) to (5), in which when one stream is transmitted to the external apparatus, the stream transmitting portion transmits a valid signal representing a valid signal period of time to the external apparatus in correspondence to each of transport stream packets; and
when a part of or all of the additional information is added either forward or backward with respect to the transport stream packet, the valid signal represents each of a period of time of the transport stream packet, and a period of time of the additional information added either forward or backward with respect to the transport stream packet as a valid signal period of time.

(8) The transmitting apparatus described in any one of the paragraphs (3) to (7), in which a time stamp is set as an absolute time based on a reference clock which is PCR-recovered.

(9) The transmitting apparatus described in any one of the paragraphs (3) to (7), in which the time stamp is set as a relative time representing a time difference from the input to the synthesis of the plural transport streams.

(10) The transmitting apparatus described in any one of the paragraphs (1) to (9), in which the stream transmitting portion transmits the one stream to the external apparatus through either a DVB-CI common interface or a CI+common interface; and
the external apparatus is a conditional access module executing descramble processing.

(11) A transmitting method including:
inputting plural transport streams;
adding additional information containing therein a stream identifier used to identify at least corresponding transport streams to respective transport stream packets of the plural transport stream thus inputted;
synthesizing the plural transport streams in which the additional information is added to each of transport stream packets, thereby obtaining one stream; and
transmitting the resulting one stream to an external apparatus,
in which in the addition of the additional information, the additional information is added forward, backward or midway with respect to each of the transport stream packets.

(12) A program in accordance with which a computer is caused to function as:
a stream inputting section inputting plural transport streams;
an information adding section adding additional information containing therein a stream identifier used to identify at least corresponding transport stream to respective transport stream packets of the plural transport streams thus inputted;
a stream synthesizing section synthesizing the plural transport streams in which the additional information is added to each of the transport stream packets, thereby obtaining one stream; and
a stream transmitting section transmitting the resulting one stream to an external apparatus, in which the information adding section adds the additional information forward, backward or midway with respect to each of the transport stream packets.

(13) A receiving apparatus including:
a stream receiving portion successively receiving transport stream packets to each of which additional information containing therein a stream identifier used to identify at least corresponding transport stream is added from an external apparatus; and
a stream reconstructing portion reconstructing plural transport streams based on the additional information from the transport stream packets,
in which the additional information is added forward, backward or midway with respect to each of the transport stream packets.

(14) The receiving apparatus described in the paragraph (13), in which the stream identifier contained in the additional information is inserted into a continuity counter area within a header of the transport stream packet.

(15) The receiving apparatus described in the paragraph (13) or (14), in which a time stamp representing an original time position in the transport stream is added together with the stream identifier to the additional information; and
the stream reconstructing portion sorts the transport stream packets into the streams in accordance with the stream identifier, and disposes the transport stream packets in time positions corresponding to the time stamps added in the streams, respectively, thereby reconstructing the plural transport streams.

(16) The receiving apparatus described in the paragraph (14) or (15), further including
a substituting portion returning values in the continuity counter areas of the headers of the transport stream packets composing the plural transport streams reconstructed back to original values, respectively.

(17) The receiving apparatus described in any one of the paragraphs (13) to (16), in which the stream receiving portion receives the transport stream packets from the external apparatus through either a DVB-CI common interface or a CI+common interface; and
the external apparatus is a conditional access module executing descramble processing.

(18) A receiving method including:
successively receiving transport stream packets to each of which additional information containing therein a stream identifier used to identify at least corresponding transport stream is added from an external apparatus; and
reconstructing plural transport streams based on the additional information from the transport stream packets,
in which the additional information is added forward, backward or midway with respect to each of the transport stream packets.

(19) A program in accordance with which a computer is caused to function as:
a stream receiving section successively receiving transport stream packets to each of which additional information containing therein a stream identifier used to identify at least corresponding transport stream is added from an external apparatus; and
a reconstructing section reconstructing plural transport streams based on the additional information from the transport stream packets,
in which the additional information is added forward, backward or midway with respect to each of the transport stream packets.

(20) An electronic apparatus including:
a transmitting apparatus and a receiving apparatus,
the transmitting apparatus including
a stream inputting portion inputting plural transport streams;
an information adding portion adding additional information containing therein a stream identifier used to identify at least corresponding transport stream to respective transport stream packets of the plural transport streams thus inputted;
a stream synthesizing portion synthesizing the plural transport streams in which the additional information is added to each of the transport stream packets, thereby obtaining one stream; and
a stream transmitting portion transmitting the resulting one stream to an external apparatus,
in which the information adding portion adds the additional information forward, backward or midway with respect to each of the transport stream packets; and
the receiving apparatus including
a stream receiving portion successively receiving transport stream packets to each of which additional information is added from an external apparatus; and
a stream reconstructing portion reconstructing plural transport streams based on the additional information from the transport stream packets.

The present disclosure contains subject matter related to that disclosed in Japanese Priority Patent Application JP 2012-115119 filed in the Japan Patent Office on May 18, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A transmitting apparatus, comprising:
a stream inputting portion inputting plural transport streams;
an information adding portion adding additional information containing therein a stream identifier used to identify at least corresponding transport stream to respective transport stream packets of the plural transport streams thus inputted;
a stream synthesizing portion synthesizing the plural transport streams in which the additional information is added to each of the transport stream packets, thereby obtaining one stream; and
a stream transmitting portion transmitting the resulting one stream to an external apparatus,
wherein the information adding portion adds the additional information forward, backward or midway with respect to each of the transport stream packets;
wherein when one stream is transmitted to the external apparatus, the stream transmitting portion transmits a valid signal representing a valid signal period of time to the external apparatus in correspondence to each of transport stream packets; and
when a part of or all of the additional information is added either forward or backward with respect to the transport stream packet, the valid signal represents each of a period of time of the transport stream packet, and a period of time of the additional information added either forward or backward with respect to the transport stream packet as a valid signal period of time.

2. The transmitting apparatus according to claim 1, wherein the information adding portion inserts the stream identifier contained in the additional information into a continuity counter area within a header of the transport stream packet.

3. The transmitting apparatus according to claim 1, wherein the additional information contains a time stamp corresponding to time of input as well as the stream identifier.

4. The transmitting apparatus according to claim 3, wherein the information adding portion inserts the stream identifier into a continuity counter area within a header of the transport stream packet, and adds the time stamp either forward or backward with respect to the transport stream.

5. The transmitting apparatus according to claim 3, wherein the information adding portion adds the stream identifier and the time stamp as a unit either forward or backward with respect to the transport stream packet.

6. The transmitting apparatus according to claim 1, wherein when one stream is transmitted to the external apparatus, the stream transmitting portion transmits a valid signal representing a valid signal period of time to the external apparatus in correspondence to each of transport stream packets; and
the valid signal represents only a period of time of the transport stream packet as the valid signal period of time.

7. The transmitting apparatus according to claim 3, wherein a time stamp is set as an absolute time based on a reference clock which is Program Clock Reference-recovered, namely PCR-recovered.

8. The transmitting apparatus according to claim 3, wherein the time stamp is set as a relative time representing a time difference from the input to the synthesis of the plural transport streams.

9. A transmitting apparatus, comprising:
a stream inputting portion inputting plural transport streams;
an information adding portion adding additional information containing therein a stream identifier used to identify at least corresponding transport stream to respective transport stream packets of the plural transport streams thus inputted;
a stream synthesizing portion synthesizing the plural transport streams in which the additional information is added to each of the transport stream packets, thereby obtaining one stream; and
a stream transmitting portion transmitting the resulting one stream to an external apparatus,
wherein the information adding portion adds the additional information forward, backward or midway with respect to each of the transport stream packets;
wherein the stream transmitting portion transmits the one stream to the external apparatus through either a Digital Video Broadcasting-Common Interface, namely DVB-CI common interface or a CI+common interface; and
the external apparatus is a conditional access module executing descramble processing.

10. A receiving apparatus, comprising:
a stream receiving portion successively receiving transport stream packets to each of which additional information containing therein a stream identifier used to identify at least corresponding transport stream is added from an external apparatus; and
a stream reconstructing portion reconstructing plural transport streams based on the additional information from the transport stream packets,
wherein the additional information is added forward, backward or midway with respect to each of the transport stream packets;
the stream receiving portion receives the transport stream packets from the external apparatus through either a DVB-CI common interface or a CI+common interface; and
the external apparatus is a conditional access module executing descrambling processing.

11. The receiving apparatus according to claim 10, wherein the stream identifier contained in the additional information is inserted into a continuity counter area within a header of the transport stream packet.

12. The receiving apparatus according to claim 11, wherein a time stamp representing an original time position in the transport stream is added together with the stream identifier to the additional information; and
the stream reconstructing portion sorts the transport stream packets into the streams in accordance with the stream identifier, and disposes the transport stream packets in time positions corresponding to the time stamps added in the streams, respectively, thereby reconstructing the plural transport streams.

13. The receiving apparatus according to claim 10, further comprising a substituting portion returning values in continuity counter areas of headers of the transport stream packets composing the plural transport streams reconstructed back to original values, respectively.

* * * * *